(12) United States Patent
Furihata et al.

(10) Patent No.: US 11,797,011 B2
(45) Date of Patent: Oct. 24, 2023

(54) TRAVELING CONTROL SYSTEM FOR TRANSPORT VEHICLE AND TRAVELING CONTROL METHOD FOR TRANSPORT VEHICLE

(71) Applicant: Seiko Epson Corporation, Tokyo (JP)

(72) Inventors: Ikuma Furihata, Nagano (JP); Hiroyuki Kanai, Nagano (JP); Kento Okumura, Markham (CA); Katsunori Ono, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 528 days.

(21) Appl. No.: 16/969,729

(22) PCT Filed: Dec. 12, 2018

(86) PCT No.: PCT/JP2018/045730
§ 371 (c)(1),
(2) Date: Aug. 13, 2020

(87) PCT Pub. No.: WO2019/159519
PCT Pub. Date: Aug. 22, 2019

(65) Prior Publication Data
US 2021/0004009 A1 Jan. 7, 2021

(30) Foreign Application Priority Data

Feb. 13, 2018 (JP) .................................. 2018-022827
Feb. 13, 2018 (JP) .................................. 2018-022828

(51) Int. Cl.
*G05D 1/02* (2020.01)
*G05D 1/00* (2006.01)
*G01C 21/20* (2006.01)

(52) U.S. Cl.
CPC .......... *G05D 1/0212* (2013.01); *G05D 1/0088* (2013.01); *G05D 1/0231* (2013.01); *G01C 21/206* (2013.01)

(58) Field of Classification Search
CPC .. G05D 1/0212; G05D 1/0088; G05D 1/0231; G05D 1/0246; G05D 2201/0216; G01C 21/206
See application file for complete search history.

(56) References Cited

U.S. PATENT DOCUMENTS 10,289,117 B1 * 5/2019 Zou .......................... B65G 1/00
10,315,231 B1 * 6/2019 Brazeau .................... B07C 5/38
(Continued)

FOREIGN PATENT DOCUMENTS

CN 104555222 A * 4/2015
JP 2002220048 A 8/2002
(Continued)

*Primary Examiner* — Jonathan M Dager
(74) *Attorney, Agent, or Firm* — CHIP LAW GROUP

(57) ABSTRACT

Provided are a traveling control system for a transport vehicle and a traveling control method for a transport vehicle capable of preventing unstable traveling when the transport vehicle travels while pulling a bogie. The traveling control system for a transport vehicle includes an imaging unit (3) provided corresponding to an operation region of a bogie (2) that travels together with a transport vehicle (1), a mode acquisition unit (14) configured to acquire a mode of the bogie based on an image including the bogie imaged by the imaging unit, and a mode determination unit (14) configured to determine a mode of the bogie based on the mode of the bogie acquired by the mode acquisition unit. Traveling of the transport vehicle is controlled based on a determination of the mode determination unit.

13 Claims, 18 Drawing Sheets

(56) References Cited

U.S. PATENT DOCUMENTS

| | | | |
|---|---|---|---|
| 10,954,067 B1* | 3/2021 | Theobald | B25J 19/022 |
| 11,300,971 B2* | 4/2022 | Hu | G05D 1/0234 |
| 11,305,935 B2* | 4/2022 | Blotnik | B65G 1/0492 |
| 2004/0215374 A1* | 10/2004 | Shepard | B60T 8/1708 |
| | | | 701/1 |
| 2009/0252577 A1* | 10/2009 | Tuffs | G05D 1/0225 |
| | | | 414/222.01 |
| 2010/0070149 A1* | 3/2010 | Fry | B60T 8/1708 |
| | | | 701/70 |
| 2012/0191272 A1* | 7/2012 | Andersen | B66F 9/24 |
| | | | 705/28 |
| 2012/0221186 A1* | 8/2012 | Bourquin | B60B 39/00 |
| | | | 701/23 |
| 2014/0027013 A1* | 1/2014 | Tojima | B67D 7/32 |
| | | | 141/192 |
| 2017/0017236 A1* | 1/2017 | Song | G08G 1/164 |
| 2017/0192438 A1* | 7/2017 | Morimoto | B60W 40/13 |
| 2017/0217589 A1* | 8/2017 | Maekawa | B64C 39/024 |
| 2018/0072212 A1* | 3/2018 | Alfaro | B60K 7/0007 |
| 2018/0215539 A1* | 8/2018 | Kimura | G05D 1/0274 |
| 2018/0246523 A1* | 8/2018 | Ogihara | G05D 1/0297 |
| 2018/0297779 A1* | 10/2018 | Masuda | B66F 9/07 |
| 2019/0196505 A1* | 6/2019 | High | G06Q 10/083 |
| 2019/0217831 A1* | 7/2019 | Viele | G07C 5/0816 |
| 2019/0361464 A1* | 11/2019 | Ahnell | G05D 1/0289 |
| 2020/0073402 A1* | 3/2020 | Brucker | G05D 1/0278 |
| 2020/0310463 A1* | 10/2020 | Beniyama | G05D 1/0212 |
| 2021/0089046 A1* | 3/2021 | Xu | G01B 11/026 |
| 2022/0043452 A1* | 2/2022 | Jacobsen | G05D 1/0223 |
| 2022/0135127 A1* | 5/2022 | Lu | B62D 5/04 |
| | | | 701/41 |

FOREIGN PATENT DOCUMENTS

| | | |
|---|---|---|
| JP | 2008156122 A | 7/2008 |
| JP | 2013041527 A | 2/2013 |
| JP | 2014186680 A | 10/2014 |

* cited by examiner

[FIG. 1]
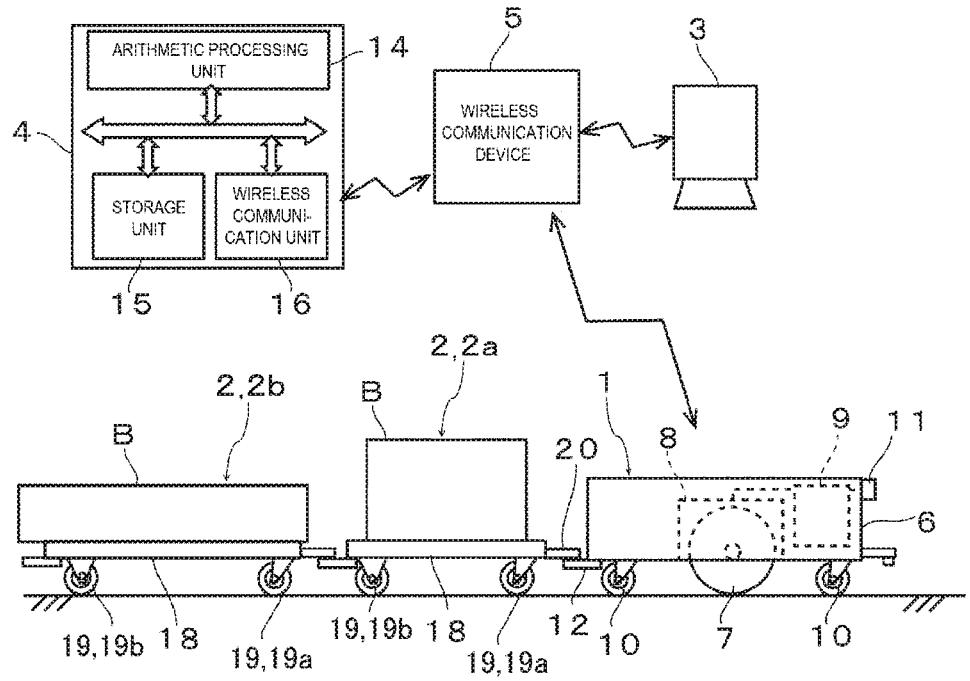
[FIG. 2]
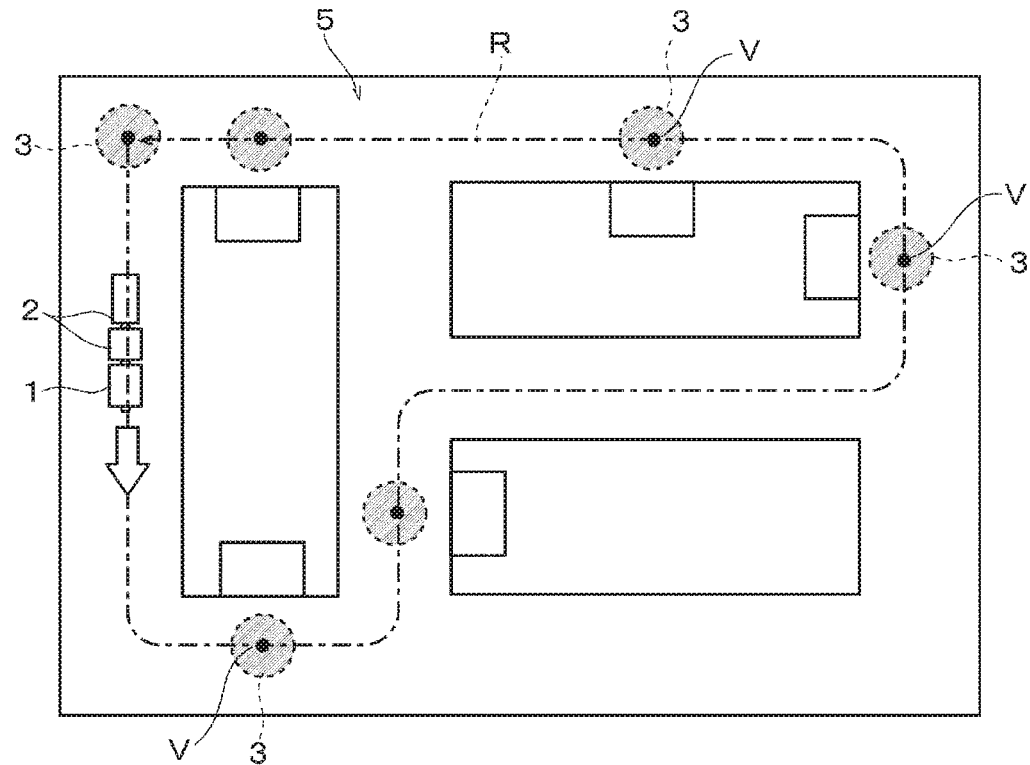

[FIG. 3]
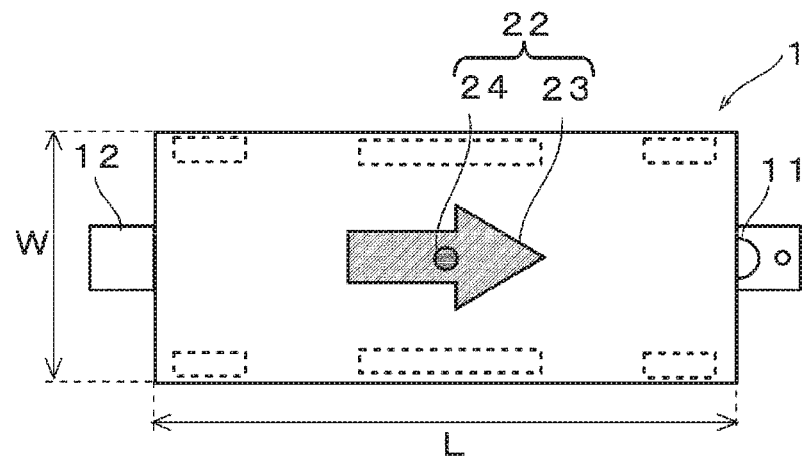
[FIG. 4]
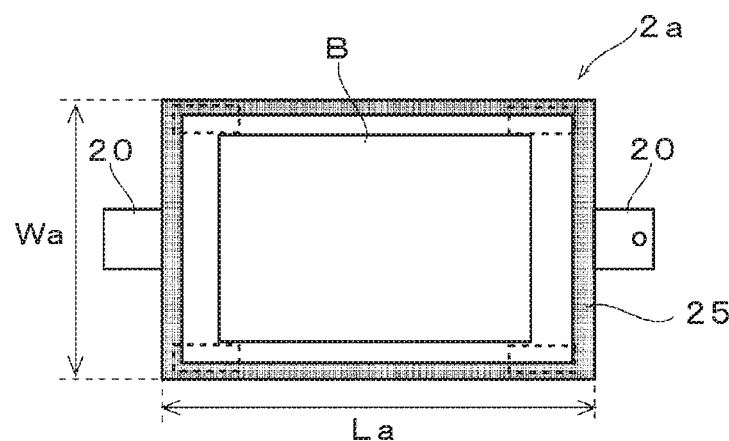
[FIG. 5]
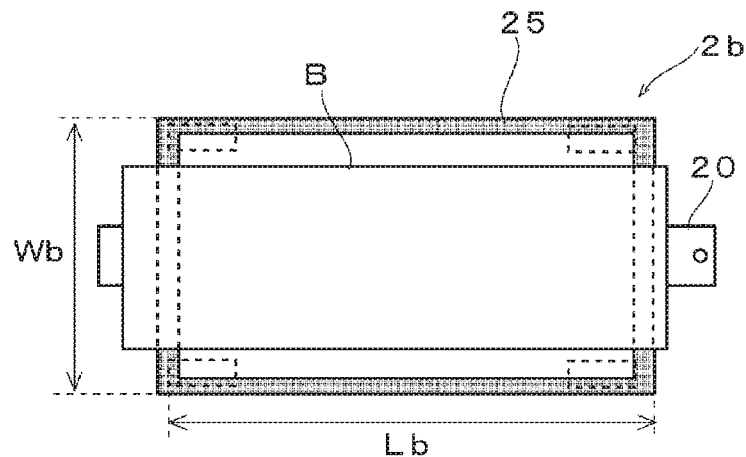

[FIG. 6]
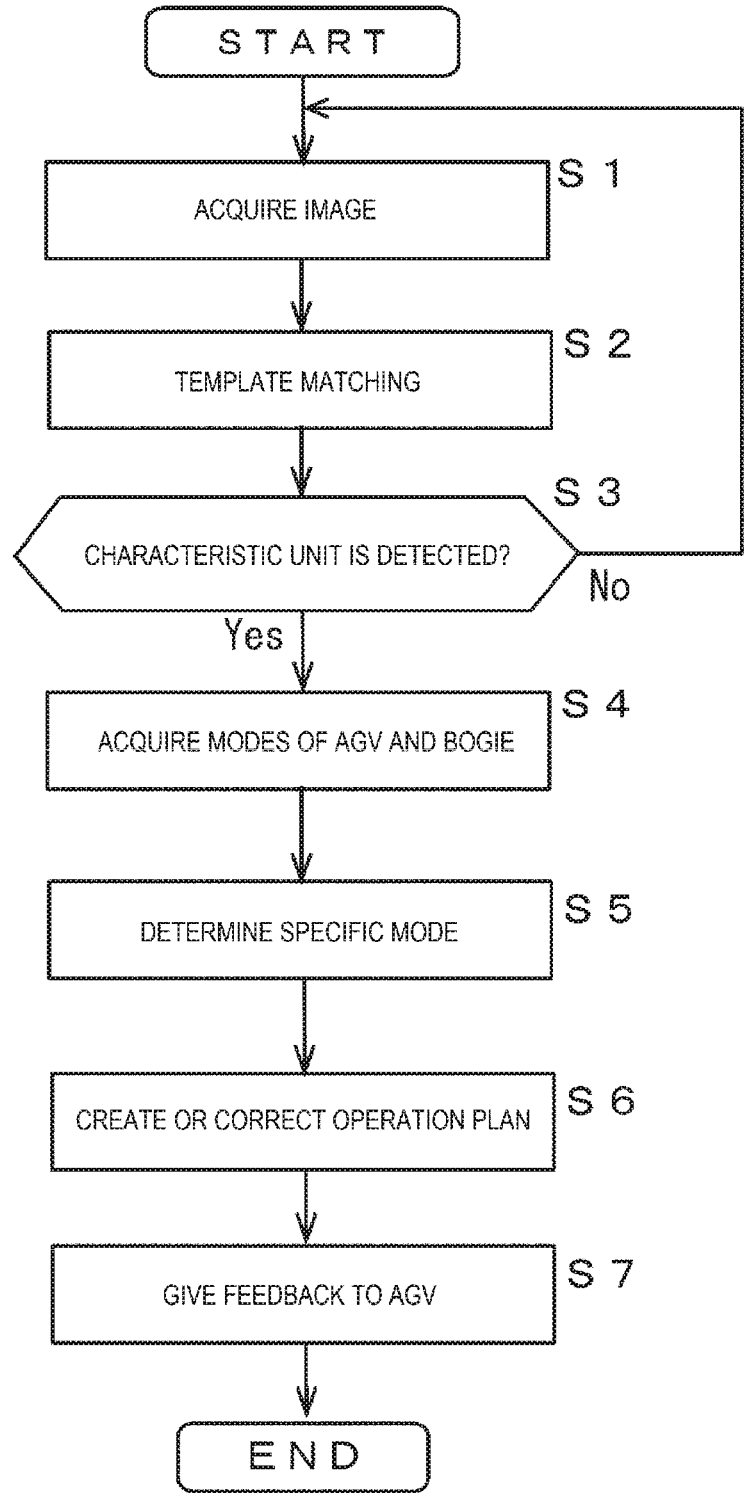

[FIG. 7]
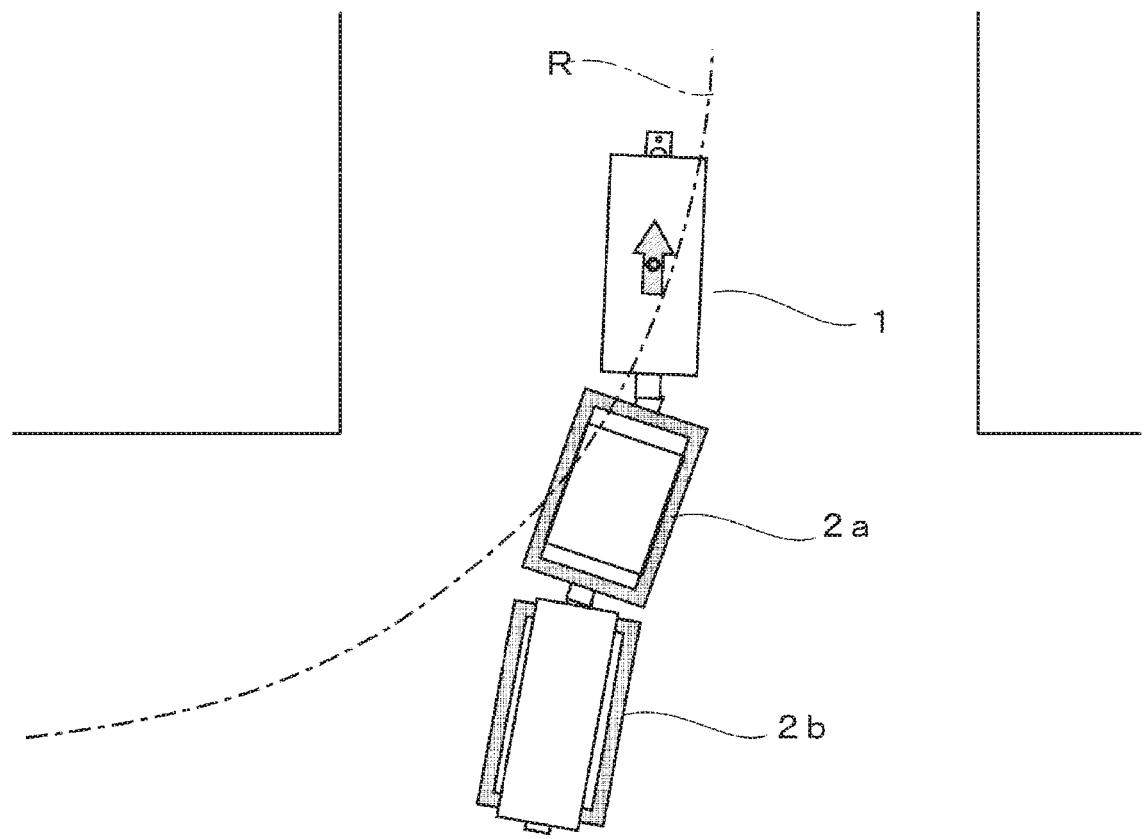

[FIG. 8]
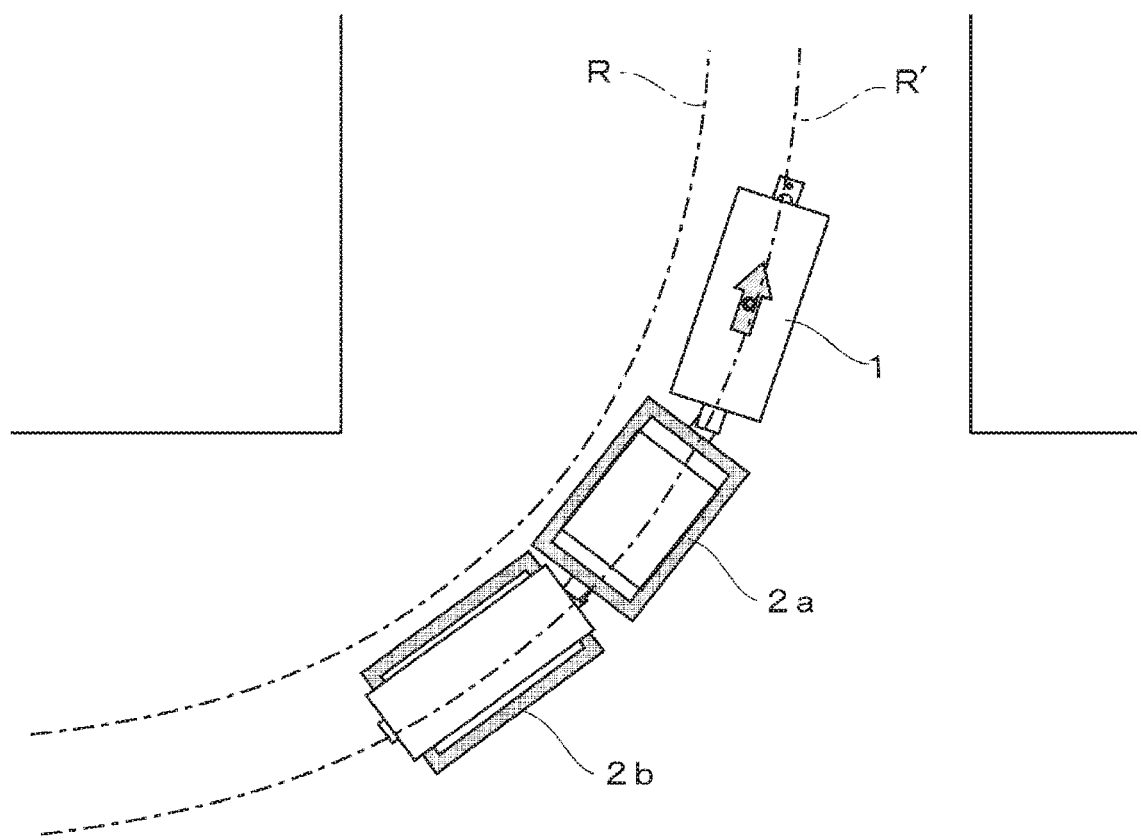

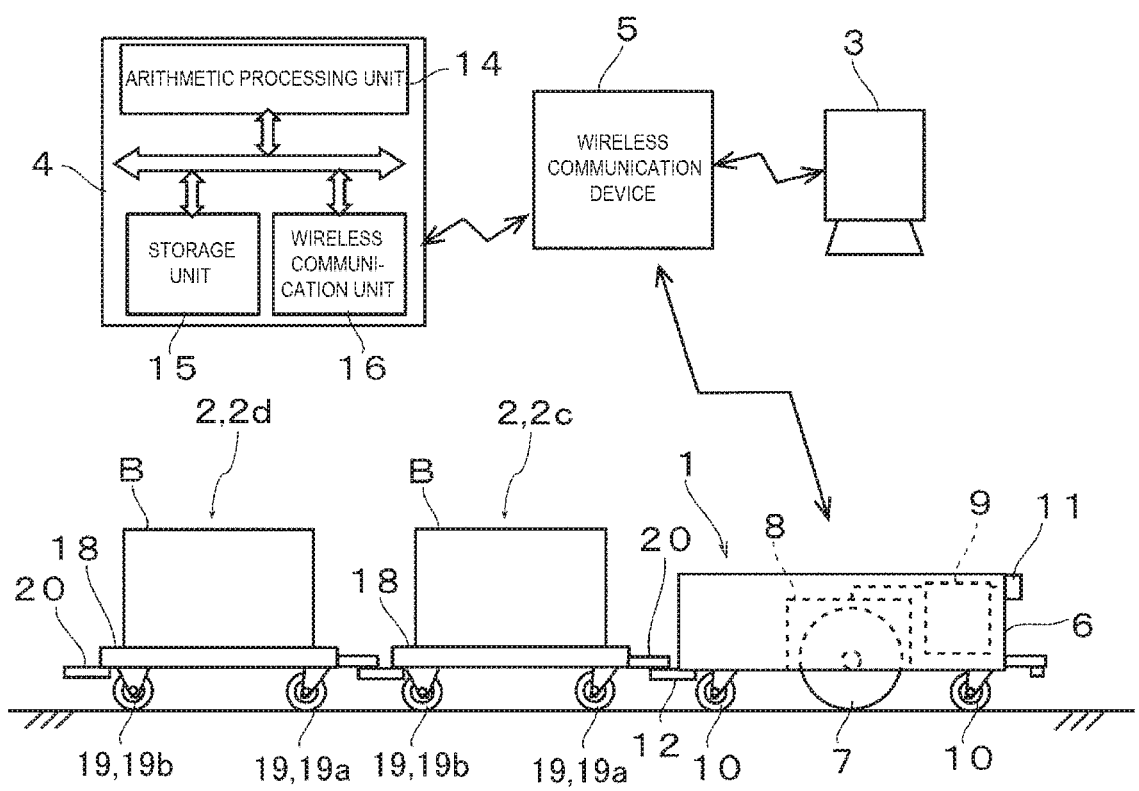
[FIG. 9]

[FIG. 10]
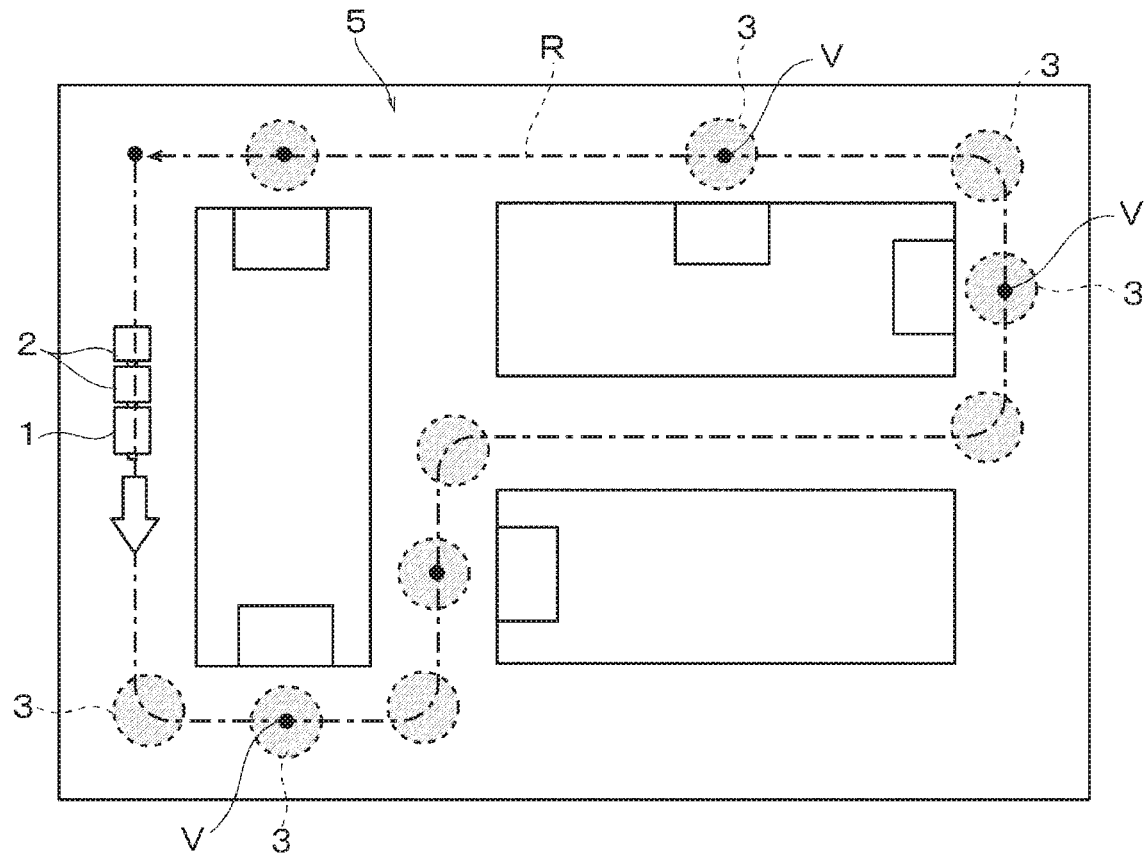
[FIG. 11]
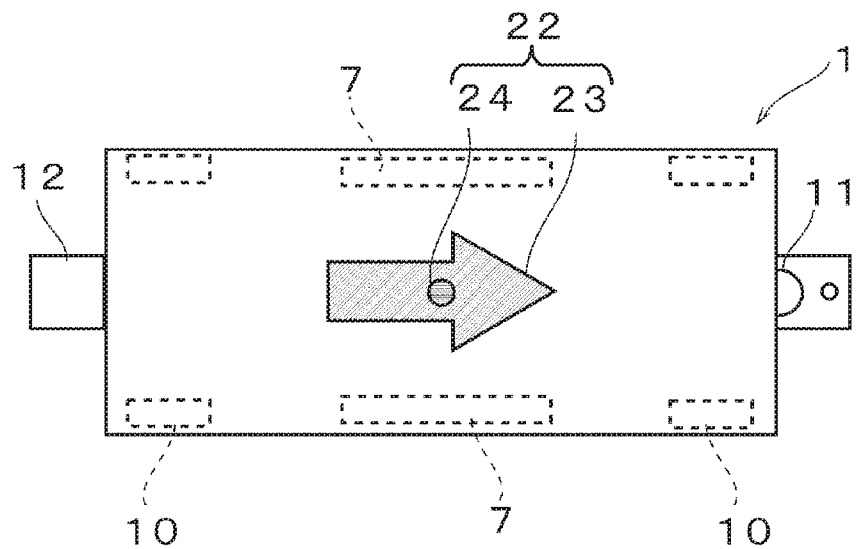

[FIG. 12]
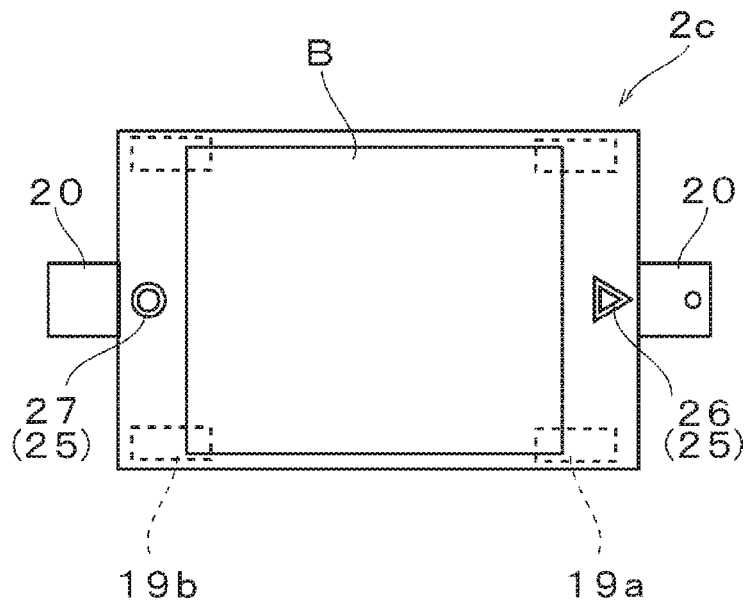
[FIG. 13]
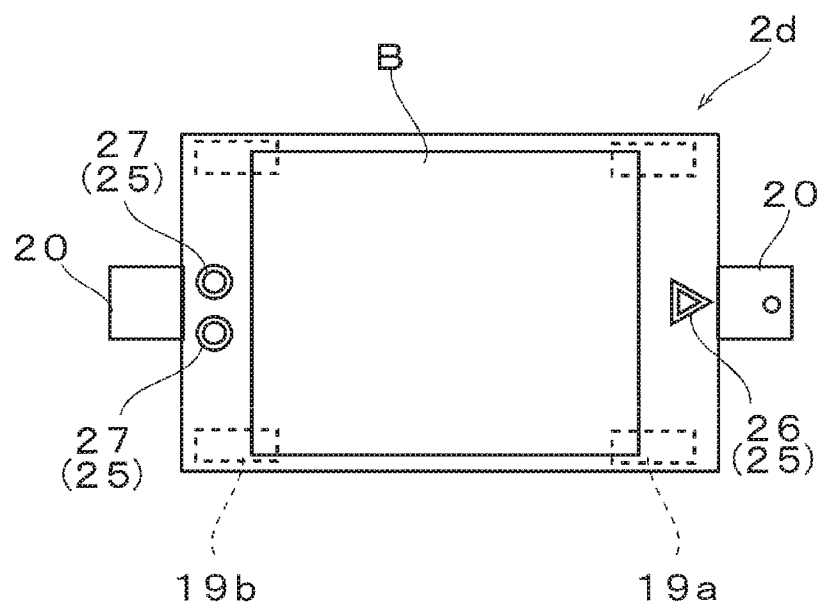

[FIG. 14]
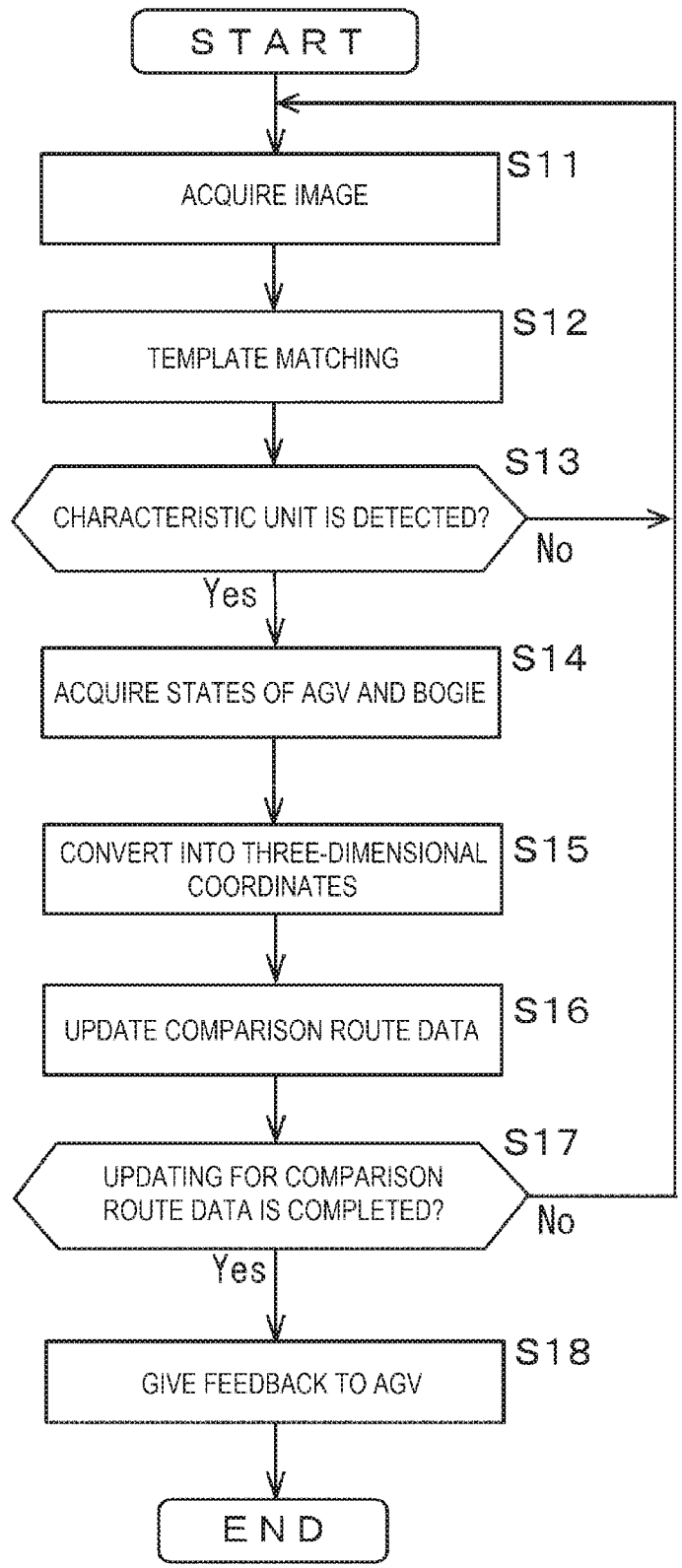

[FIG. 15]
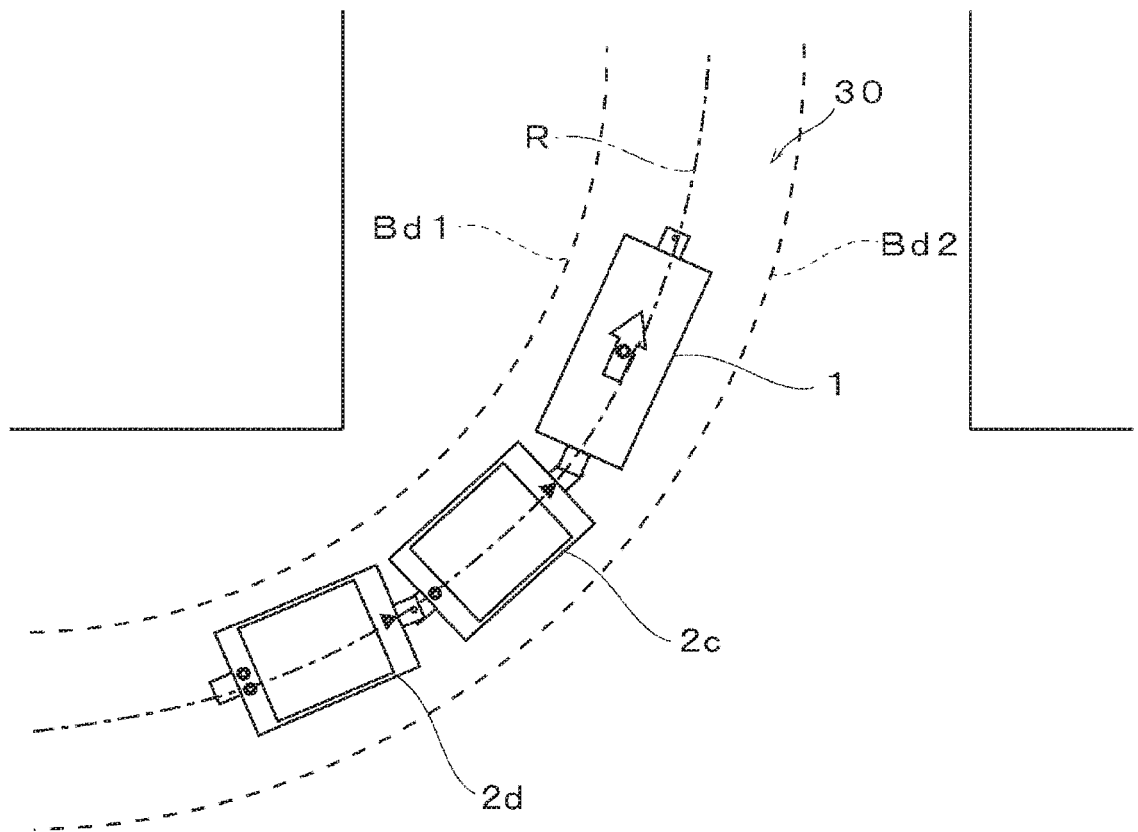

[FIG. 16]
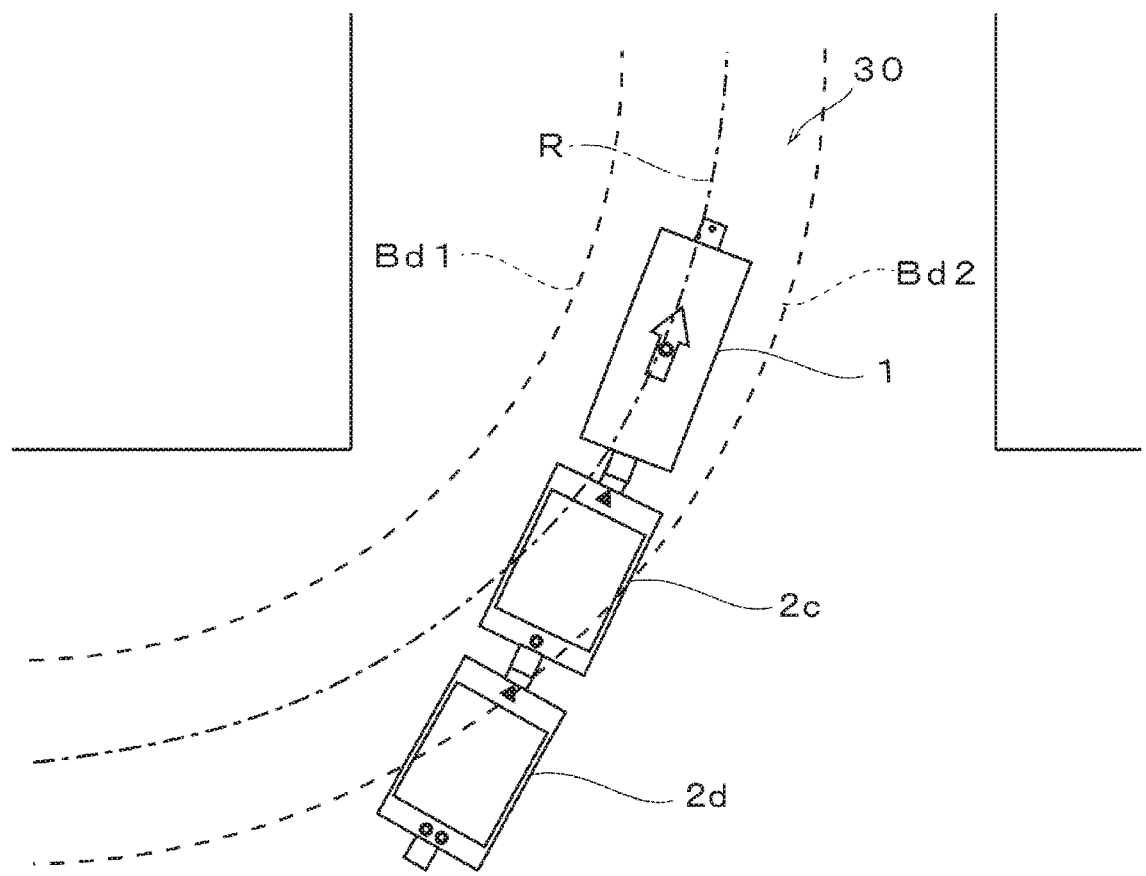

[FIG. 17]
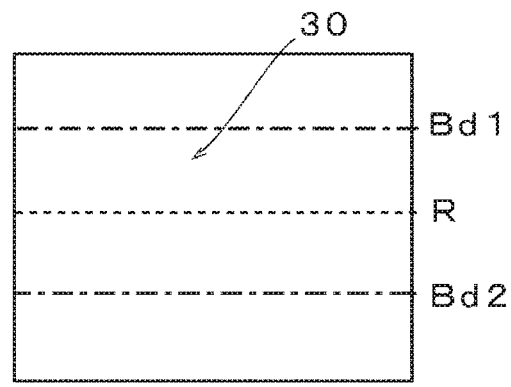
[FIG. 18]
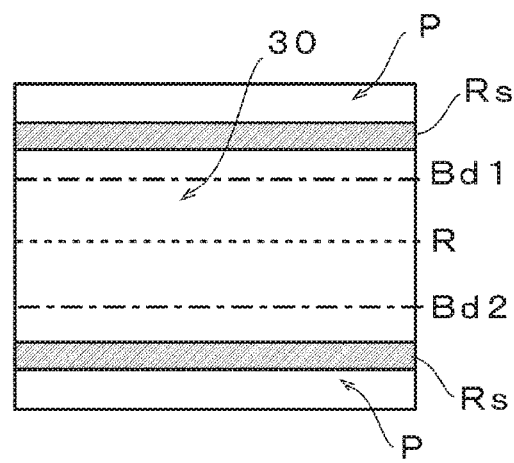
[FIG. 19]
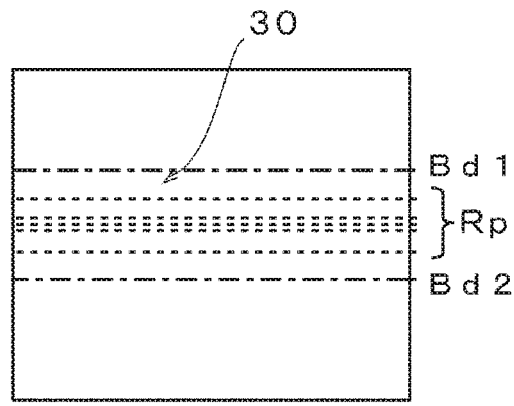

[FIG. 20]
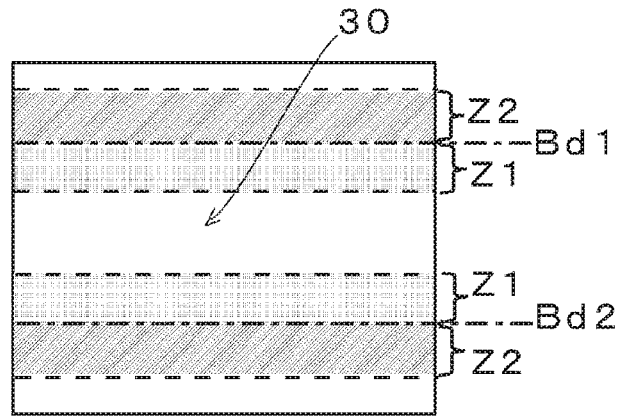
[FIG. 21]
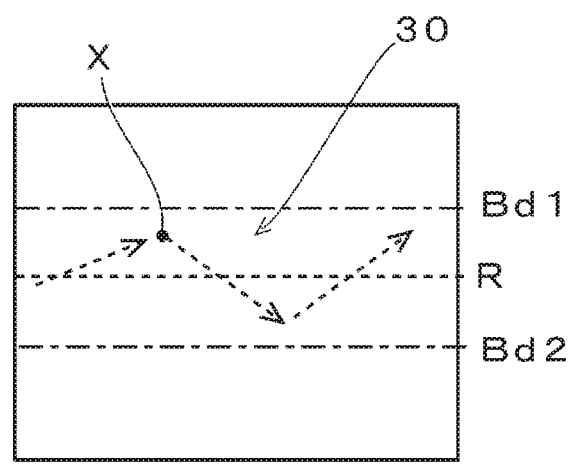
[FIG. 22]
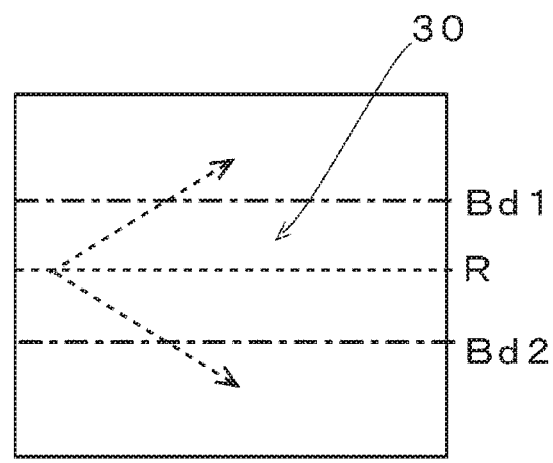

[FIG. 23]
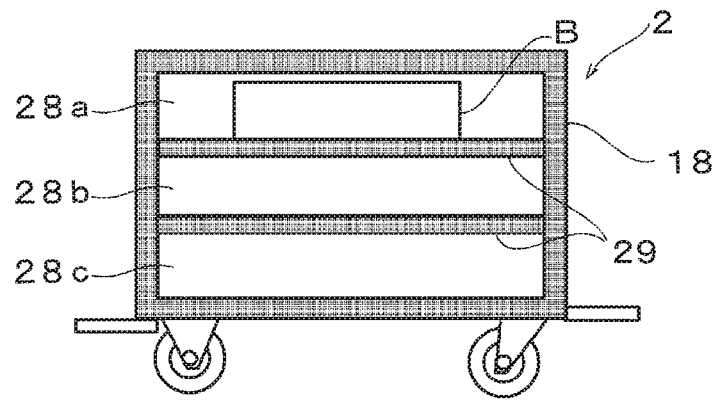
[FIG. 24]
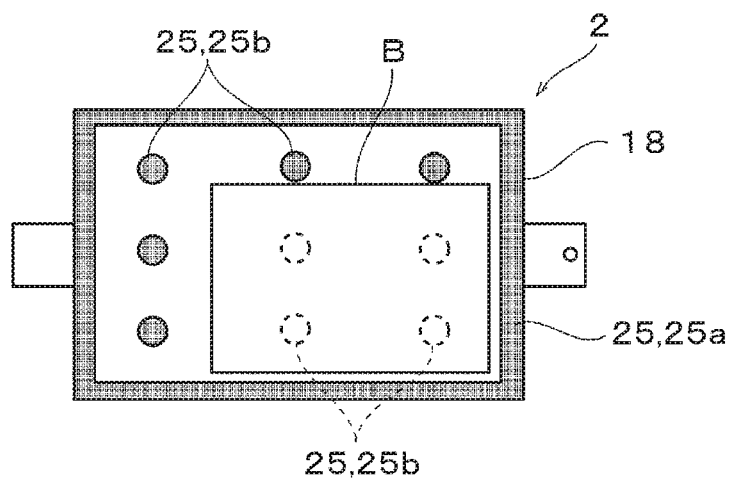
[FIG. 25]
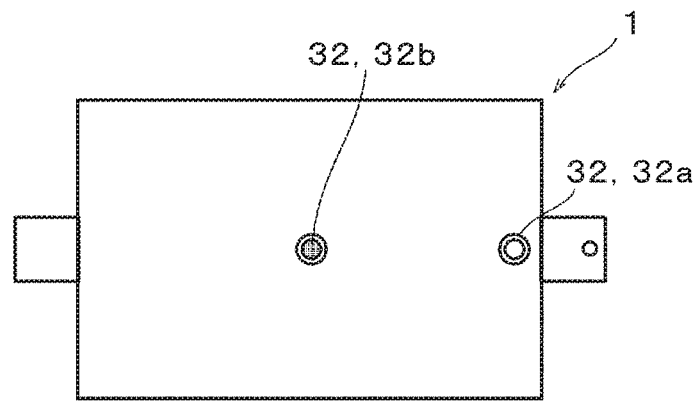

[FIG. 26]
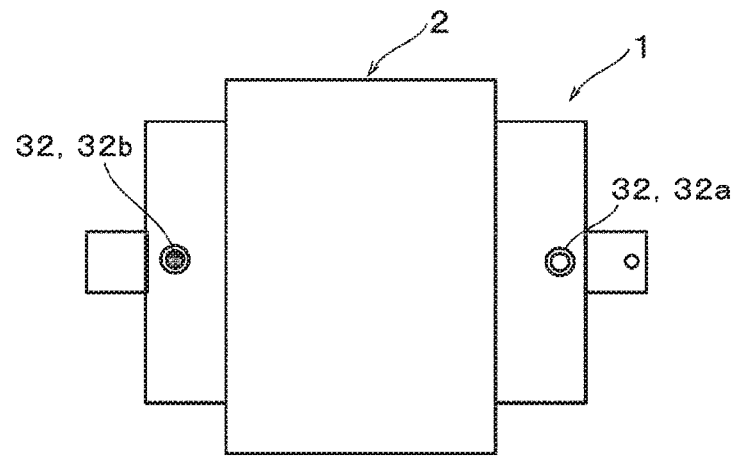
[FIG. 27]
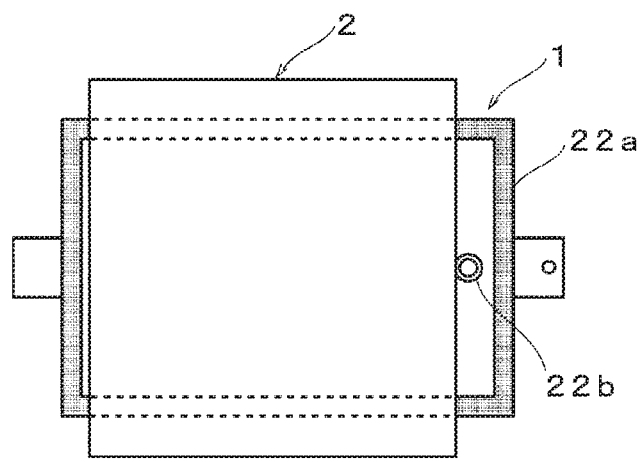
[FIG. 28]
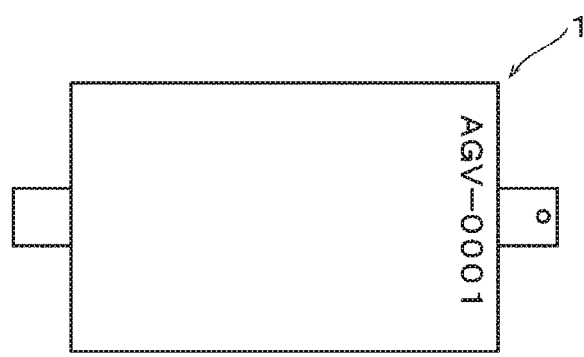

[FIG. 29]
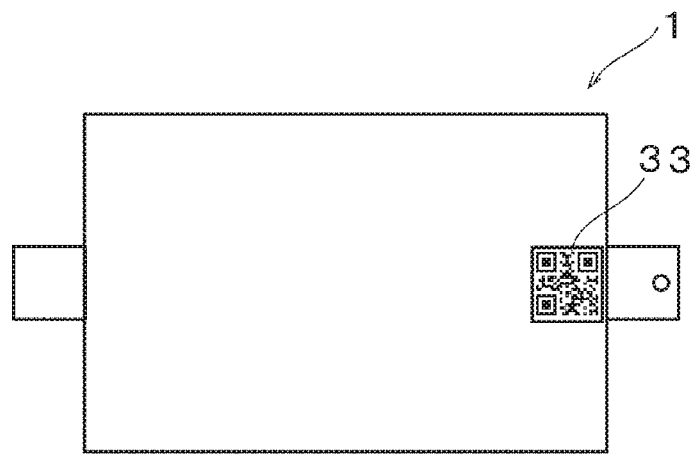
[FIG. 30]
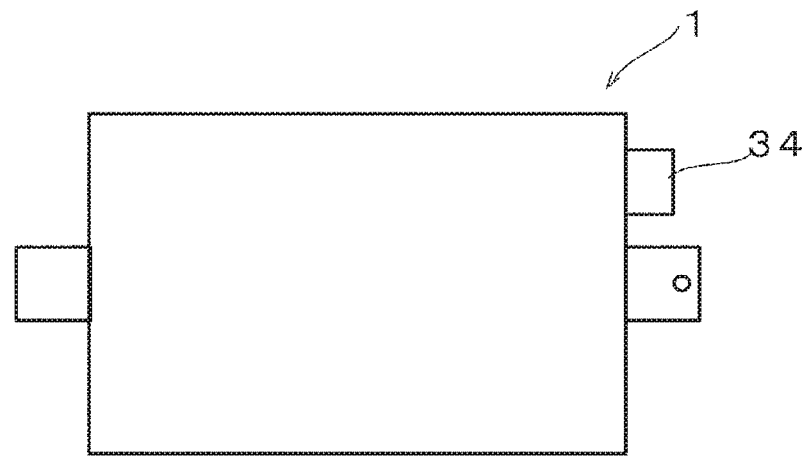

[FIG. 31]
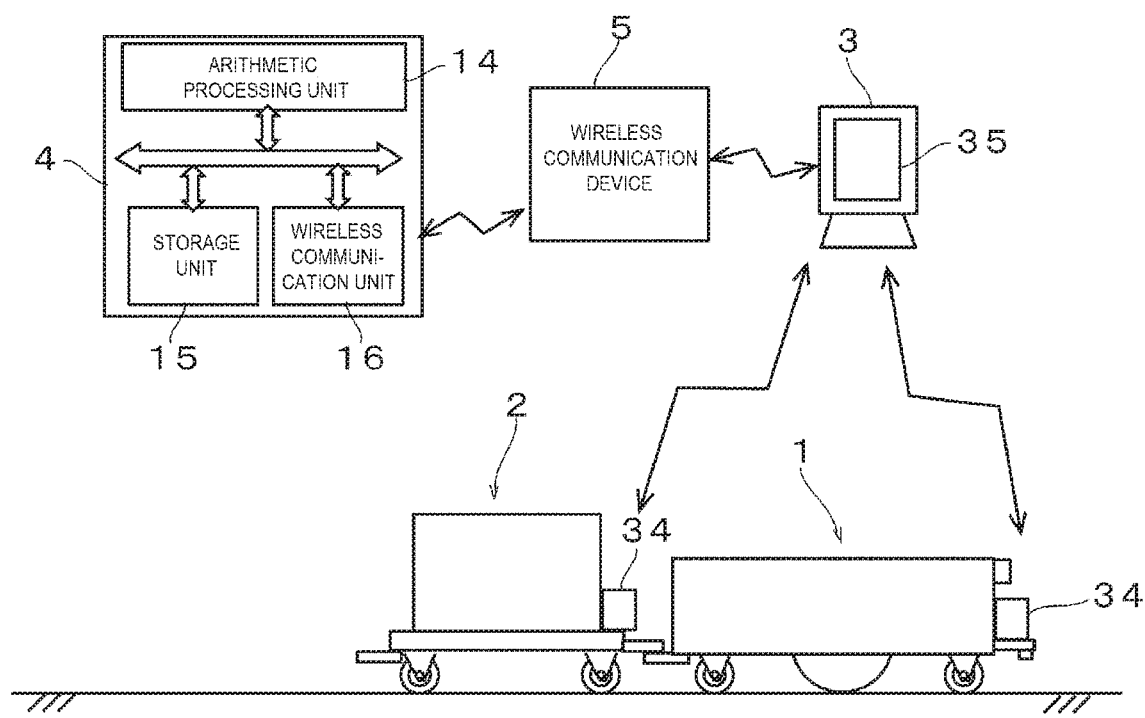

[FIG. 32]
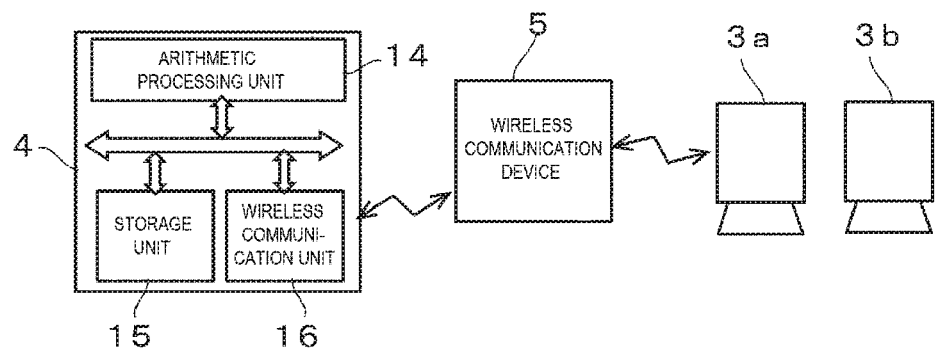
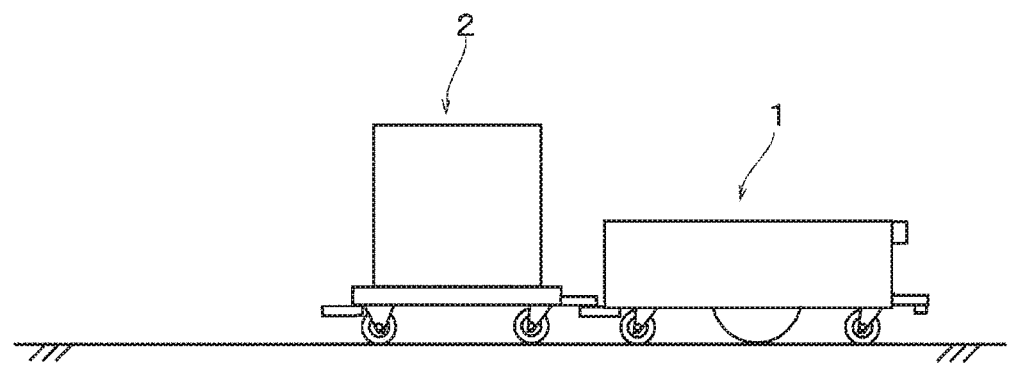
[FIG. 33]
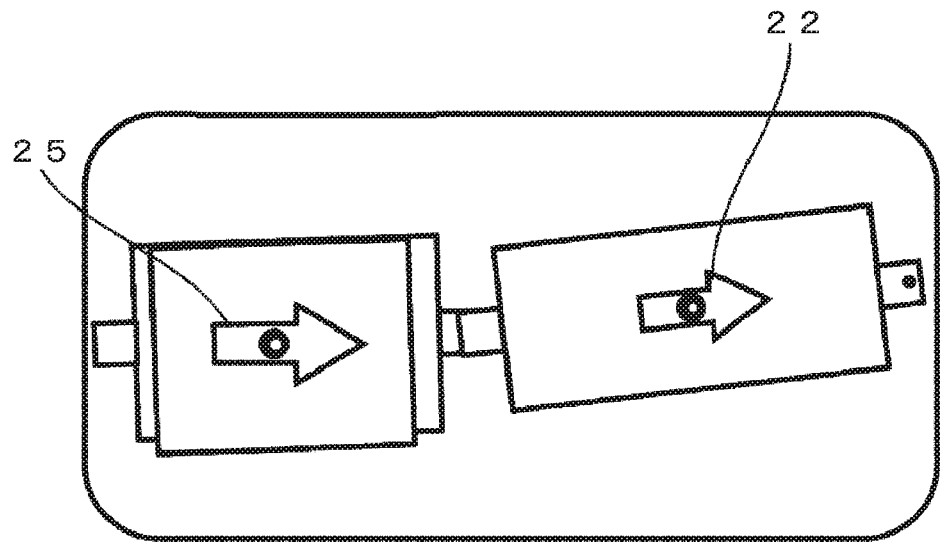

TRAVELING CONTROL SYSTEM FOR TRANSPORT VEHICLE AND TRAVELING CONTROL METHOD FOR TRANSPORT VEHICLE

CROSS REFERENCE TO RELATED APPLICATIONS

This application is a U.S. National Phase of International Patent Application No. PCT/JP2018/045730 filed on Dec. 12, 2018, which claims priority benefit of Japanese Patent Application No. JP 2018-022828 filed in the Japan Patent Office on Feb. 13, 2018 and also claims priority benefit of Japanese Patent Application No. JP 2018-022827 filed in the Japan Patent Office on Feb. 13, 2018. Each of the above-referenced applications is hereby incorporated herein by reference in its entirety.

TECHNICAL FIELD

The disclosure relates to a traveling control system for a transport vehicle that travels automatically while pulling a bogie and a traveling control method for a transport vehicle.

BACKGROUND ART

An unmanned transport vehicle capable of traveling automatically (in other words, an automatic guided vehicle (AGV)) can load cargo in a factory or a warehouse, or pull a bogie loading cargo, and can travel automatically. When such a transport vehicle travels on a transport route (in other words, an operation region) while pulling the bogie, the AGV or the bogie may swing to left or right with respect to a travel direction and the traveling may become unstable. In particular, when the AGV changes the travel direction at a corner or a curve, the AGV or the bogie may swing (in other words, wobble), deviate from an original transport route, and come into contact with an article or a structure provided on the transport route. With respect to such a problem, an AGV including a mechanism for preventing the AGV from swinging with respect to a travel direction is proposed (see PTL 1, for example).

CITATION LIST

Patent Literature

PTL 1: JP-A-2002-220048

SUMMARY

Technical Problem

However, when the AGV travels while pulling the bogie loading the cargo, the bogie cannot be prevented from wobbling even when the mechanism described above is provided in the AGV. Moreover, such wobbling is different depending on modes such as the number of bogies pulled by the AGV, a shape of the bogie, a state of the cargo loaded on the bogie, or a size and a weight of the cargo loaded on the bogie. Therefore, it is difficult to prevent the AGV and the bogie from wobbling in a configuration in the related art.

The disclosure has been conceived in view of the above circumstances, and an object of the disclosure is to provide a traveling control system for a transport vehicle and a traveling control method for a transport vehicle that can prevent unstable traveling when the transport vehicle travels while pulling the bogie.

Solution to Problem

A traveling control system for a transport vehicle according to the disclosure has been proposed to achieve the above object. In the traveling control system for a transport vehicle that travels automatically together with a bogie, traveling of the transport vehicle is controlled according to a mode of the bogie that travels in an operation region.

According to the disclosure, unstable traveling when the transport vehicle travels while pulling the bogie can be prevented by controlling the traveling of the transport vehicle according to the mode of the bogie.

In the configuration described above, it is desirable to adopt a configuration including an imaging unit provided corresponding to an operation region of the transport vehicle and a mode acquisition unit configured to acquire the mode of the bogie based on an image including the bogie imaged by the imaging unit.

According to this configuration, since a mode in which the bogie is actually coupled to the transport vehicle can be acquired, the traveling of the transport vehicle can be more accurately controlled.

In the configuration described above, it is desirable to adopt a configuration in which a first characteristic unit is attached to the bogie, and the mode acquisition unit acquires the mode of the bogie based on an image including the first characteristic unit imaged by the imaging unit.

According to this configuration, the mode of the bogie can be more accurately acquired from the first characteristic unit included in the image imaged by the imaging unit.

In the configuration described above, it is desirable to adopt a configuration including a mode determination unit configured to determine a mode of the bogie based on the mode of the bogie acquired by the mode acquisition unit, in which the traveling of the transport vehicle is controlled based on a determination of the mode determination unit.

According to this configuration, the traveling of the transport vehicle can be more accurately controlled by determining a more specific mode among the acquired modes.

In each configuration described above, it is desirable to adopt a configuration in which a second characteristic unit is attached to the transport vehicle, the mode acquisition unit acquires a coupling mode of the transport vehicle to the bogie based on an image including the second characteristic unit imaged by the imaging unit, and the traveling of the transport vehicle is controlled based on the coupling mode acquired by the mode acquisition unit.

According to this configuration, the coupling mode of the transport vehicle to the bogie can be reflected in a traveling control of the transport vehicle.

In each configuration described above, it is desirable to adopt a configuration in which the operation region includes a via-point through which the bogie passes, and the imaging unit is provided corresponding to the via-point.

According to this configuration, the imaging unit is provided at the via-point through which the bogie passes, the mode of the bogie is acquired based on an image imaged by the imaging unit, and the traveling of the transport vehicle is controlled based on the mode. Therefore, unstable traveling when the mode of the bogie changes before and after the via-point can be more reliably prevented.

A traveling control method for a transport vehicle according to the disclosure is a method for controlling traveling of the transport vehicle that travels automatically together with a bogie, in which traveling of the transport vehicle is controlled according to a mode of the bogie that travels in an operation region.

The traveling control system for a transport vehicle according to the disclosure is a system for controlling traveling of the transport vehicle that travels automatically together with a bogie, in which traveling of the transport vehicle is controlled according to a movement of the bogie that travels in an operation region.

According to the disclosure, unstable traveling when the transport vehicle travels while pulling the bogie can be prevented by controlling the traveling of the transport vehicle according to the movement of the bogie.

In the configuration described above, it is desirable to adopt a configuration including an imaging unit provided corresponding to an operation region of the bogie and a movement acquisition unit configured to acquire the movement of the bogie based on an image including the bogie imaged by the imaging unit.

According to this configuration, since a movement when the bogie actually travels in the operation region can be acquired, the traveling of the transport vehicle can be more accurately controlled.

In the configuration described above, it is desirable to adopt a configuration in which a first characteristic unit is attached to the bogie, and the movement acquisition unit acquires the movement of the bogie based on an image including the first characteristic unit imaged by the imaging unit.

According to this configuration, the movement of the bogie can be more accurately acquired from the first characteristic unit included in the image imaged by the imaging unit.

In the configuration described above, it is desirable to adopt a configuration including a traveling state determination unit configured to determine a traveling state of the bogie based on the movement of the bogie acquired by the movement acquisition unit, in which the traveling of the transport vehicle is controlled based on a determination of the traveling state determination unit.

In the configuration, the traveling state determination unit determines whether the bogie is located inside a travel region having a predetermined width with reference to a travel route of the bogie that is preset in the operation region.

According to this configuration, whether the bogie travels normally along the travel route can be determined by determining whether the bogie is located inside the travel region.

In each configuration described above, it is desirable to adopt a configuration in which a second characteristic unit is attached to the transport vehicle, the movement acquisition unit acquires a movement of the transport vehicle based on an image including the second characteristic unit imaged by the imaging unit, and the traveling of the transport vehicle is controlled based on the movement of the transport vehicle acquired by the movement acquisition unit.

According to this configuration, since the traveling of the transport vehicle is controlled based on the movement of the bogie and the movement of the transport vehicle, unstable traveling when the transport vehicle travels while pulling the bogie is more effectively prevented.

In each configuration described above, it is desirable to adopt a configuration in which the operation region has a first region where the bogie travels along a virtual straight line and a second region where the bogie travels along a virtual curve, and the imaging unit is provided corresponding to the second region.

According to this configuration, the imaging unit is provided in the second region where wobbling is likely to occur in the traveling of the transport vehicle and the bogie, the movement of the bogie is acquired based on an image imaged by the imaging unit and the traveling of the transport vehicle is controlled based on the movement. Therefore, unstable traveling when the transport vehicle travels while pulling the bogie is more reliably prevented.

In the configuration described above, a configuration in which the operation region has a third region where the bogie is stopped and the imaging unit is provided corresponding to the third region may be adopted.

According to this configuration, the imaging unit is provided in the third region where the bogie is stopped, the movement of the bogie is acquired based on an image imaged by the imaging unit and the traveling of the transport vehicle is controlled based on the movement. Therefore, unstable traveling during a time when the bogie is stopped and then restarted is more reliably prevented.

The traveling control method for a transport vehicle according to the disclosure is a method for controlling traveling of the transport vehicle that travels automatically together with a bogie, in which traveling of the transport vehicle is controlled according to a movement of the bogie that travels in an operation region.

BRIEF DESCRIPTION OF DRAWINGS

FIG. 1 is a schematic diagram showing a configuration example of a traveling control system for a transport vehicle according to a first embodiment.

FIG. 2 is a plan view showing an example of a travel course of the transport vehicle.

FIG. 3 is a plan view showing the transport vehicle.

FIG. 4 is a plan view showing a bogie.

FIG. 5 is a plan view showing a bogie.

FIG. 6 is a flowchart showing a flow of a traveling control of the transport vehicle.

FIG. 7 is a diagram showing a traveling control of the transport vehicle and the bogie based on an operation plan.

FIG. 8 is a diagram showing a traveling control of the transport vehicle and the bogie based on an operation plan.

FIG. 9 is a schematic diagram showing a configuration example of a traveling control system for a transport vehicle according to a second embodiment.

FIG. 10 is a plan view showing an example of a travel course of the transport vehicle.

FIG. 11 is a plan view showing the transport vehicle.

FIG. 12 is a plan view showing a bogie.

FIG. 13 is a plan view showing a bogie.

FIG. 14 is a flowchart showing a flow of a traveling control of the transport vehicle.

FIG. 15 is a diagram showing a traveling state determination for the transport vehicle and the bogie.

FIG. 16 is a diagram showing a traveling state determination for the transport vehicle and the bogie.

FIG. 17 is a diagram showing setting of a travel region for determining a traveling state.

FIG. 18 is a diagram showing setting of a travel region for determining a traveling state.

FIG. 19 is a diagram showing setting of a travel region for determining a traveling state.

FIG. 20 is a diagram showing feedback of a traveling control of a transport vehicle according to a modification.

FIG. 21 is a diagram showing feedback of a traveling control of a transport vehicle according to a modification.

FIG. 22 is a diagram showing feedback of a traveling control of a transport vehicle according to a modification.

FIG. 23 is a diagram showing an example of an image obtained by imaging a bogie from a side.

FIG. 24 is a diagram showing a bogie characteristic unit according to a modification.

FIG. 25 is a diagram showing an AGV characteristic unit according to a modification.

FIG. 26 is a diagram showing an AGV characteristic unit 22 and a bogie characteristic unit 25 according to a modification.

FIG. 27 is a diagram showing an AGV characteristic unit according to another modification.

FIG. 28 is a diagram showing an identification unit for an AGV and a bogie according to a modification.

FIG. 29 is a diagram showing an identification unit for an AGV and a bogie according to a modification.

FIG. 30 is a diagram showing an identification unit for an AGV and a bogie according to a modification.

FIG. 31 is a diagram showing an identification unit for an AGV and a bogie according to a modification.

FIG. 32 is a schematic diagram showing a configuration example of a traveling control system for a transport vehicle according to a third embodiment.

FIG. 33 is a diagram showing an example of an image imaged by a plurality of cameras shown in FIG. 32.

DESCRIPTION OF EMBODIMENTS

Hereinafter, embodiments of the disclosure will be described with reference to the drawings. In the embodiments described below, various limitations are given as preferred specific examples of the disclosure, but the scope of the disclosure is not limited to these embodiments unless otherwise specified in the following description.

First Embodiment

FIG. 1 is a schematic diagram showing a configuration example of a traveling control system for a transport vehicle (hereinafter, referred to as an AGV) 1 according to the first embodiment. FIG. 2 is a plan view showing an example of an operation region (hereinafter, referred to as a travel course) where the AGV 1 travels together with a bogie 2 based on an operation plan or a cargo is loaded onto or unloaded from the bogie 2 at a via-point to be described later. In FIG. 2, a dashed-dotted line indicates a virtual travel route R of the AGV 1, that is, a set route scheduled according to an operation instruction from an information processing device 4.

The traveling control system according to the present embodiment includes the AGV 1, the bogie 2 coupled to the AGV 1, a camera 3 (one type of an imaging unit according to the disclosure) configured to image the AGV 1 and the bogie 2 from above, the information processing device 4, and a wireless communication device 5.

The information processing device 4 is a computer for managing the operation of the AGV 1. The information processing device 4 creates route data (in other words, route information) based on map data (in other words, map information) of a travel course or an operation plan of the AGV 1 from measurement data of the travel course received from the AGV 1.

Based on an image imaged by the camera 3 to be described later, the information processing device 4 acquires various modes of the bogie 2 such as the number of the bogie 2 pulled by the AGV 1, a shape and a dimension of the bogie 2, a state of the cargo loaded on the bogie 2, and a total length from the AGV 1 at front to the last bogie 2, or gives a feedback on a traveling control to the AGV 1 according to the acquired modes. An information processing device serving as a host may be coupled to the information processing device 4.

The wireless communication device 5 is a master station for performing communication using a wireless LAN, and wirelessly connects a wireless communication unit 16 of the information processing device 4, the AGV 1, and the camera 3 to transmit and receive data.

The AGV 1 travels in an operation region in accordance with pre-stored map data and route data while pulling the bogie 2. The map data is data created by the information processing device 4 based on measurement data obtained by the AGV 1 actually traveling in a travel course while a laser sensor 11 performing scanning to be described later. The route data is created based on an operation plan, for example, the AGV 1 travels from which place to which place and passes through which via-point, and includes a coordinate group indicating a route in the map data.

The AGV 1 according to the present embodiment includes a main body frame 6, a pair of drive wheels 7, a pair of drive units 8 including motors that independently drive the drive wheels 7 and the like, casters 10 independently provided at four corners on a lower surface of the main body frame 6 so as to be freely turnable, the laser sensor 11 configured to detect an obstacle or the like on the travel route, a control unit 9 configured to control the laser sensor 11 and the drive units 8, and a coupling unit 12 for coupling the AGV 1 to the bogie 2.

Although not shown, the AGV 1 according to the present embodiment includes a storage unit for storing the map data, the route data, and the like, a communication unit for performing wireless communication between the wireless communication device 5 and the communication unit, a power supply unit, and the like.

The bogie 2 pulled by the AGV 1 includes a loading platform 18, wheels 19 independently provided at four corners of a bottom surface of the loading platform 18, and a coupling unit 20 for coupling the bogie 2 to the AGV 1 or another bogie 2. In the present embodiment, a plurality of bogies 2, specifically, a first bogie 2a and a second bogie 2b having different shapes are coupled to the AGV 1. The number of the bogie 2 coupled to the AGV 1 is not limited to two, and may be one or three or more. As the loading platform 18 of the bogie 2, those having various modes may be adopted, for example, a loading platform having a portion surrounding the loaded cargo such as a box body and a combination of frame members such as a pipe, and a flat plate-like loading platform that simply loads the cargo. The flat plate-like loading platform 18 is adopted in the present embodiment. Among the wheels 19 of the loading platform 18, freely turnable casters 19a are attached to front wheels so that a travel direction can be changed according to the traveling of the AGV 1. On the other hand, rear wheels 19b are fixed in a straight travel direction (in other words, in an aligning direction of the front wheels and the rear wheels).

The laser sensor 11 included in the AGV 1 is provided in front of the AGV 1, and measures a distance from the AGV 1 to an obstacle by irradiating the obstacle with laser light and receiving reflected light from the obstacle. The laser sensor 11 according to the present embodiment can perform scanning using laser light to the left and right with respect to the travel direction. Then, the AGV 1 travels on a travel course while the laser sensor 11 performs scanning to recognize the obstacle and outputs measurement data thus obtained to the wireless communication unit 16 of the information processing device 4 via the wireless communication device 5, so that map data of the travel course can be created based on the measurement data. The control unit 9 of the AGV 1 includes a CPU, a storage unit, and the like (not shown). The control unit 9 stores, in the storage unit, the measurement data obtained by the laser sensor 11, the map data created by the information processing device 4 based on the measurement data, route data of a travel route R scheduled in a transport course of the map data, and the like. The control unit 9 is configured to control, based on the route data and the map data, the AGV 1 to travel on the travel course such that the AGV 1 passes through a via-point instructed by the information processing device 4, that is, for example, a place where the cargo is loaded or unloaded.

FIG. 3 is a plan view showing the AGV 1. As shown in the figure, an AGV characteristic unit 22 (a type of a second characteristic unit according to the disclosure) for indicating a position and a direction of the AG 1 on the travel course is attached to an upper surface of the AGV 1.

The AGV characteristic unit 22 according to the present embodiment includes a combination of a direction marker 23 that is an arrow indicating a direction of the AGV 1 and a center marker 24 that is a circle or a point indicating the center of the AGV 1. The direction marker 23 is formed of a figure or a symbol asymmetrical in a front-rear direction of the AGV 1. As will be described later, an arithmetic processing unit 14 of the information processing device 4 is configured to acquire a position (in other words, coordinates) and a direction of the AGV 1 on the map data by recognizing the AGV characteristic unit 22 from image data imaged by the camera 3. The arithmetic processing unit 14 may be configured to recognize a center of the AGV characteristic unit 22 based on the direction marker 23. That is, for example, the arithmetic processing unit 14 may be configured to recognize a tip end and a rear end of the arrow that is the direction marker 23, and acquire the center of the AGV characteristic unit 22 by calculation.

FIG. 4 is a plan view showing the first bogie 2a. FIG. 5 is a plan view showing the second bogie 2b. Similar to the AGV 1, a bogie characteristic unit 25 (that is, a type of a first characteristic unit according to the disclosure) is attached to each of the first bogie 2a and the second bogie 2b.

The bogie characteristic unit 25 according to the present embodiment has a frame shape having a predetermined width along an outer peripheral edge of the loading platform 18. Similar to the case of the AGV 1, the arithmetic processing unit 14 of the information processing device 4 can acquire modes of the bogies 2 by recognizing the bogie characteristic unit 25 of each of the bogies 2a and 2b from image data imaged by the camera 3.

In the present embodiment, the arithmetic processing unit 14 can acquire modes, such as the number of the bogies 2 coupled to and pulled by the AGV 1 and a shape and a dimension of the bogie 2, by recognizing the bogie characteristic unit 25 of each bogie 2. In addition, the arithmetic processing unit 14 can acquire a center position of each bogie 2 from the recognized bogie characteristic unit 25 by calculation. Further, the arithmetic processing unit 14 can acquire, based on the AGV characteristic unit 22 and the bogie characteristic unit 25, a total length from the AGV 1 at front to the second bogie 2b at rear in a state in which the AGV 1 and the bogies 2a and 2b are aligned on a straight line.

For example, a length from the center of the AGV 1 at front to a center of the second bogie 2b at rear can be set as the total length. Alternatively, a tip end position of the AGV 1 at front can be calculated based on the AGV characteristic unit 22, a rear end position of the second bogie 2b at rear can be calculated based on the bogie characteristic unit 25, and an interval from the tip end position to the rear end position can be set as the total length.

Based on whether the entire shape of the bogie characteristic unit 25 is recognized or a part of the shape of the bogie characteristic unit 25 is missing and recognized, the arithmetic processing unit 14 can acquire, as a mode of the bogie 2, the presence or absence of protrusion of a cargo B loaded on the bogie 2. That is, as the bogie characteristic unit 25 of the bogie 2a shown in FIG. 4, when no shape of the bogie characteristic unit 25 of the bogie 2a is missing (except for a slight missing due to noise or the like) and the entire shape is recognized by template matching to be described later, the arithmetic processing unit 14 acquires a mode in which the cargo B does not protrude from the loading platform 18. On the other hand, as the bogie characteristic unit 25 of the bogie 2b shown in FIG. 5, when a state in which a part of the shape of the bogie characteristic unit 25 of the bogie 2b is missing and recognized by template matching, the arithmetic processing unit 14 acquires a state in which the cargo B protrudes from the loading platform 18. In the example shown in FIG. 5, the bogie characteristic unit 25 is recognized, by template matching, in a state in which a part of the frame-shaped bogie characteristic unit 25 is missing. Accordingly, the arithmetic processing unit 14 acquires a state in which the cargo B separately protrudes from a front side and a rear side of the loading platform 18.

When the loading platform 18 of the bogie 2 has a configuration in which the loading platform 18 is a box type that accommodates the cargo therein and the cargo is covered up by an upper surface of the loading platform 18 as viewed from above (that is, from a camera 3 side), the bogie characteristic unit 25 including a combination of a direction marker and a center marker can also be attached to the upper surface of the loading platform 18 in a similar manner as the AGV characteristic unit 22 (see FIG. 32, for example).

The camera 3 includes a lens, a CCD, a wireless communication unit (not shown), and the like, and outputs image data obtained by imaging the AGV 1 and the bogie 2 on the travel course to the wireless communication unit 16 of the information processing device 4 via the wireless communication device 5. As shown in FIG. 2, the cameras 3 are separately provided at a start place where the AGV 1 and the bogie 2 start traveling on the travel course of the AGV 1, that is, a position corresponding to a start point of the travel route R, and a position corresponding to a via-point V where the AGV 1 is temporarily stopped and the cargo is loaded onto or unloaded from the bogie 2. Positions of the cameras 3 on the map data or heights of the cameras 3 with respect to the travel route R, that is, three-dimensional coordinates of the cameras 3, are pre-fixed and then calibration is completed. The cameras 3 are adjusted so as to be able to recognize the AGV characteristic unit 22 of the AGV 1 and the bogie characteristic unit 25 of the bogie 2 from the images obtained by imaging the AGV 1 and the bogie 2 on the travel course by an image processing performed by the information processing device 4.

The information processing device 4 according to the present embodiment includes the arithmetic processing unit 14, a storage unit 15, and the wireless communication unit 16. The storage unit 15 includes, for example, a hard disk drive, a non-volatile storage element, and the like. The storage unit 15 stores the map data, route data, image data imaged from the cameras 3, and the like in addition to various application programs including an operation system and an image processing application. The arithmetic processing unit 14 includes a CPU, a ROM, a RAM, and the like (not shown), and performs various types of processings such as an image processing in accordance with the operation system stored in the storage unit 15. The arithmetic processing unit 14 functions as a mode acquisition unit according to the disclosure, and acquires modes of the AGV 1, that is, a position or a direction on the travel course, by recognizing the AGV characteristic unit 22 from the image data imaged by the camera 3. More specifically, the arithmetic processing unit 14 recognizes the AGV characteristic unit 22 by comparing the image data with a pre-prepared reference image (referred to as a template as appropriate) of the AGV characteristic unit 22, that is, by template matching. Then, the arithmetic processing unit 14 acquires a direction of the AGV 1 by recognizing a direction of the arrow that is the direction marker 23. The arithmetic processing unit 14 acquires coordinates of the AGV 1 on the map data by recognizing the circle that is the center marker 24 of the AGV characteristic unit 22.

Similarly, the arithmetic processing unit 14 recognizes the bogie characteristic unit 25 by template matching, with a pre-prepared reference image of the bogie characteristic unit 25, and acquires modes of the bogie 2, that is, the number of the bogie 2 coupled to and pulled by the AGV 1, the shape of the bogie 2, and the presence or absence of protrusion of the cargo B, and acquires coordinates of the center of the bogie 2 on the map data by calculation. Further, based on the recognized AGV characteristic unit 22 and the recognized bogie characteristic unit 25, the arithmetic processing unit 14 acquires the total length from the AGV 1 at front to the second bogie 2b at rear, as described above. According to the present embodiment, more specific modes of the AGV 1 and the bogies 2, for example, information such as specific numerical values of dimensions and weights are stored, that is, registered in the storage unit 15 as a mode table in association with templates of the AGV 1 and the bogie 2.

FIG. 6 is a flowchart showing a flow of a traveling control (that is, a traveling control method) of the AGV 1 performed by the information processing device 4. When an operation instruction is transmitted from the information processing device 4 to the AGV 1, as shown in FIG. 2, the AGV 1 travels while pulling the bogie 2 in accordance with the operation instruction so as to trace the travel route R set in the travel course based on the map data and the route data. At this time, the cameras 3 image the AGV 1 and the bogies 2a and 2b in a region corresponding to the start point of the travel route R and regions corresponding to the via-points V through which the AGV 1 temporarily passes. Then, the information processing device 4 acquires image data including the AGV 1 and the bogies 2a and 2b imaged by the cameras 3 (step S1). Subsequently, the arithmetic processing unit 14 of the information processing device 4 performs template matching described above for the acquired image data (step S2). Next, as a result of the template matching, it is determined whether the AGV characteristic unit 22 and the bogie characteristic unit 25 can be detected from the image data (step S3). When it is determined that the characteristic units 22 and 25, that is, the AGV characteristic unit 22 and the bogie characteristic unit 25 are not detected (No), the traveling control returns to step S1, and image data is acquired from the cameras 3 again to perform template matching.

When it is determined the characteristic units 22 and 25 are detected in step S3 (Yes), modes of the AGV 1 and the bogies 2a and 2b are acquired based on the detected characteristic units 22 and 25 (step S4). That is, the arithmetic processing unit 14 functions as a mode acquisition unit to acquire, based on the AGV characteristic unit 22, modes of the AGV 1, that is, a position and a direction within the travel course, and similarly to acquire, based on the bogie characteristic unit 25, the number of the bogies 2, shapes of the bogies 2, the presence and absence of protrusion of the cargo B, and the like. In this manner, the modes of the AGV 1 and the bogie 2 can be acquired by recognizing the characteristic units 22 and 25 included in the images imaged by the cameras 3. Therefore, an operation of inputting the modes of the AGV 1 and the bogie 2 into the information processing device 4 by an operator is not required. Since a mode in which the bogie 2 is actually coupled to the AGV 1 can be acquired, traveling of the AGV 1 and the bogie 2 can be more accurately controlled.

Subsequently, the arithmetic processing unit 14 functions as a mode determination unit according to the disclosure, to determine more specific modes of the AGV 1 and the bogies 2a and 2b (step S5). That is, among the acquired modes, the arithmetic processing unit 14 determines more specific numerical values such as dimensions and weights of the AGV 1 and the bogies 2a and 2b with reference to the mode table described above. For example, various pieces of information such as a length L, a width W, and a weight of the AGV 1 are determined as shown in FIG. 3. Similarly, various pieces of information such as a length La, a width Wa, and a weight of the first bogie 2a are determined as shown in FIG. 4, and various pieces of information such as a length Lb, a width Wb, and a weight of the second bogie 2b are determined as shown in FIG. 5. A part of the specific modes may be determined by an image processing or the like based on the image data acquired from the camera 3. In this manner, the traveling of the AGV 1 can be controlled more accurately by determining the specific modes among the acquired modes. For example, the determination may not be necessarily performed for a mode in which obtaining more specific numerical values such as the number of the bogie 2 pulled by the AGV 1 and the presence or absence of protrusions of the cargo B is not necessary.

Next, an operation plan of the AGV 1 is created or a once created operation plan is corrected based on the acquired modes and the determined specific modes (step S6). The operation plan includes information such as a travel speed at the time of straight traveling or curve traveling (that is, at the time of changing a travel direction) in addition to the route data and the like described above. The creation of the operation plan is performed when the modes of the AGV 1 and the bogies 2a and 2b are acquired and determined at the start point of the travel route R. The correction of the operation plan is performed when the modes of the AGV 1 and the bogies 2a and 2b are acquired and determined at the via-points V of the travel route R.

FIGS. 7 and 8 are diagrams showing a traveling control of the AGV 1 and the bogies 2a and 2b based on an operation plan. For example, when the travel route R indicated by a dashed-dotted line shown in FIGS. 7 and 8 is a route corresponding to a mode in which the number of the bogie 2 pulled by the AGV 1 is one (for example, the first bogie 2a) (hereinafter, referred to as a reference mode), a mode determined this time is a mode in which the two bogies 2a and 2b are pulled and, among the bogies 2a and 2b, the shape of the second bogie 2b is longer than the shape of the first bogie 2a in a front-rear direction. Therefore, a total weight or an overall balance of the bogies 2a and 2b pulled by the AGV 1 is different from that in the reference mode. Therefore, when the travel speed and the travel route are set to be the same as those in the reference mode in the operation plan, the AGV 1 and the bogies 2a and 2b may swing to the left or right with respect to the travel direction, and the traveling may become unstable as shown in FIG. 7. In particular, when the AGV 1 changes the travel direction at a corner or a curve, the AGV 1 or the bogies 2a and 2b may wobble, and may come into contact with an article or a structure provided on the travel course. The reference mode is not limited to the one in the example described above, and may be set to any mode.

Therefore, the arithmetic processing unit 14 creates, based on the modes determined at the start point of the travel route R, an operation plan such that the travel speed of the AGV 1, in particular, the travel speed when the AGV 1 changes the travel direction at a corner or a curve, is lower than the travel speed in the case of the reference mode (that is, a reference value), or a radius of a trajectory at the corner or the curve, that is, a virtual curve, in the travel route R is increased as shown in FIG. 8. In the example shown in FIG. 8, a travel route indicated by R' having a radius of a virtual curve larger than the radius of the travel route R in the reference mode is set. In a mode in which unstable traveling such as wobbling is less likely to occur as compared with the reference mode, for example, the dimension of the bogie 2 is smaller than the dimension of the bogie 2 corresponding to the reference mode, an operation plan in which the travel speed of the AGV 1 is faster than the travel speed in the case of the reference mode, or the radius of the virtual curve in the travel route R is reduced can be created.

Similarly, the number of the bogie 2 may be increased or reduced at the via-point V. In this case, the mode of the bogie 2 is changed. In a state in which the mode is changed in such a manner, when the operation plan is not changed and the traveling is restarted, the traveling of the AGV 1 and the bogie 2 may become unstable. According to the present embodiment, the camera 3 is also provided at a region corresponding to the via-point V, the modes of the AGV 1 and the bogie 2 are acquired and determined based on the image imaged by the camera 3, and the operation plan is corrected based on the modes.

Such an operation plan based on the modes of the AGV 1 and the bogie 2 can be created or corrected by, for example, selecting a travel route and a travel speed corresponding to a mode of this time from pre-defined setting of a plurality of travel routes and travel speeds, or performing calculation and simulation based on a past operation plan and evaluation information at the time of traveling corresponding to the past operation plan, for example, information of a route on which the AGV 1 and the bogie 2 actually traveled based on the operation plan. Accordingly, even when the modes of the AGV 1 and the bogie 2 are changed, the operation plan can be more efficiently created and corrected without adjusting the modes each time.

Subsequently, the arithmetic processing unit 14 gives feedback to the AGV 1 about the created operation plan or the corrected operation plan as described above (step S7). Then, the control unit 9 of the AGV 1 controls the drive units 8 in accordance with the operation plan fed back from the arithmetic processing unit 14 of the information processing device 4 to perform speed adjustment, and the AGV 1 travels along a set travel route. That is, the traveling of the AGV 1 is controlled based on the modes of the AGV 1 and the bogie 2. Such a control prevents unstable traveling when the AGV 1 travels while pulling the bogies 2a and 2b loading the cargo or the like. Accordingly, regardless of the modes such as the number, shape, and dimension of the bogie 2 pulled by the AGV 1, wobbling during the traveling of the AGV 1 and the bogie 2 can be prevented and the AGV 1 and the bogie 2 can travel along the scheduled travel route R. As a result, the AGV 1 and the bogies 2a and 2b can be prevented from coming into contact with an article or a structure provided in the vicinity of the travel course. According to the present embodiment, the camera 3 is also provided in the region corresponding to the via-point V, the modes of the AGV 1 and the bogie 2 are acquired based on the image imaged by the camera 3, and the traveling of the AGV 1 is controlled based on the modes. Therefore, unstable traveling can be more reliably prevented when the mode of the bogie 2 is changed before and after the via-point V.

Second Embodiment

FIG. 9 is a schematic diagram showing a configuration example of a traveling control system for a transport vehicle (hereinafter, referred to as an AGV) 1 according to the present embodiment. FIG. 10 is a plan view showing an example of an operation region (hereinafter, also referred to as a travel course) where the AGV 1 travels together with the bogie 2 based on an operation plan and the cargo is loaded onto or unloaded from the bogie 2 at a via-point to be described later. In FIG. 10, a dashed-dotted line indicates the virtual travel route R of the AGV 1, that is, a set route scheduled in accordance with an operation instruction from the information processing device 4. A straight line portion (in other words, a virtual straight line) in the travel route R corresponds to a first region according to the disclosure, and a curve portion (in other words, a virtual curve) corresponds to a second region according to the disclosure. That is, since the AGV 1 and the bogie 2 travel in accordance with the travel route R, the AGV 1 and the bogie 2 travel along the virtual straight line in the first region and travel along the virtual curve in the second region.

Since the traveling control system according to the present embodiment is the same as that according to the embodiment described above, a detailed description will be omitted. The information processing device 4 according to the present embodiment acquires a movement of the AGV 1 or the bogie 2 based on an image imaged by the camera 3 to be described later and determines a traveling state according to the movement to give feedback to the AGV 1 about a traveling control. An information processing device serving as a host may be coupled to the information processing device 4. The wireless communication device 5 is a master station for performing communication using a wireless LAN, and wirelessly connects the information processing device 4, the AGV 1, and the camera 3 to transmit and receive data.

The AGV 1 travels in an operation region in accordance with pre-stored map data and route data while pulling the bogie 2. The map data is data created by the information processing device 4 based on measurement data obtained by the AGV 1 actually traveling in a travel course while the laser sensor 11 performing scanning to be described later. The route data is created based on an operation plan of the AGV 1 (for example, the AGV 1 travels from which place to which place and passes through which via-point), and includes a coordinate group indicating a route in the map data. The AGV 1 according to the present embodiment includes the main body frame 6, a pair of left and right drive wheels 7, a pair of drive units 8 including motors and the like that independently drive the drive wheels 7, the casters 10 independently provided at four corners on the lower surface of the main body frame 6 to be freely turnable, the laser sensor 11 configured to detect an obstacle or the like on the travel route, the control unit 9 configured to control the laser sensor 11 and the drive units 8, and the coupling unit 12 for coupling the AGV 1 to the bogie 2. Although not shown, the AGV 1 according to the present embodiment includes a storage unit for storing the map data, the route data, and the like, a communication unit for performing wireless communication between the wireless communication device 5 and the communication unit, a power supply unit, and the like.

The bogie 2 pulled by the AGV 1 includes the loading platform 18, the wheels 19 independently provided at four corners of the bottom surface of the loading platform 18, and the coupling unit 20 for coupling the bogie 2 to the AGV 1 or another bogie 2. In the present embodiment, a plurality of bogies, specifically, two bogies 2c and 2d, are coupled to the AGV 1. The number of the bogie 2 coupled to the AGV 1 is not limited to two, and may be one or three or more. As the loading platform 18 of the bogie 2, those having various modes may be adopted, for example, a loading platform having a portion surrounding the loaded cargo such as a box body and a combination of frame members such as a pipe, and a flat plate-like loading platform that simply loads the cargo. The flat plate-like loading platform 18 is adopted in the present embodiment. Among the wheels 19 of the loading platform 18, the freely turnable casters 19a are attached to front wheels so that a travel direction can be changed according to the traveling of the AGV 1. On the other hand, the rear wheels 19b are fixed in a straight travel direction (in other words, in an aligning direction of the front wheels and the rear wheels).

The laser sensor 11 included in the AGV 1 is provided in front of the AGV 1, and measures a distance from the AGV 1 to an obstacle by irradiating the obstacle with laser light and receiving reflected light from the obstacle. The laser sensor 11 according to the present embodiment can perform scanning using laser light to the left and right with respect to the travel direction. Then, the AGV 1 travels on the travel course while the laser sensor 11 performs scanning to recognize the obstacle and outputs measurement data thus obtained to the information processing device 4 via the wireless communication device 5, so that map data of the travel course can be created based on the measurement data. The control unit 9 of the AGV 1 includes a CPU, a storage unit, and the like (not shown). The control unit 9 stores, in the storage unit, the measurement data obtained by the laser sensor 11, the map data created by the information processing device 4 based on the measurement data, route data of the travel route R scheduled in a transport course of the map data, and the like. The control unit 9 is configured to control, based on the route data and the map data, the AGV 1 to travel on the travel course such that the AGV 1 passed through a via-point (for example, a place where the cargo is loaded or unloaded) instructed by the information processing device 4.

FIG. 11 is a plan view showing the AGV 1. As shown in the figure, the AGV characteristic unit 22 (a type of the second characteristic unit according to the disclosure) for indicating a position and a direction on the travel course is attached to the upper surface of the AGV 1. The AGV characteristic unit 22 according to the present embodiment includes a combination of the direction marker 23 that is an arrow indicating a direction of the AGV 1, and the center marker 24 that is a circle or a point indicating the center of the AGV 1. The direction marker 23 is formed of a figure or a symbol asymmetrical in the front-rear direction of the AGV 1. As will be described later, the arithmetic processing unit 14 of the information processing device 4 is configured to acquire a position (in other words, coordinates) and a direction of the AGV 1 on the map data, that is, acquire a movement of the AGV 1, by recognizing the AGV characteristic unit 22 from the image data imaged by the camera 3. The arithmetic processing unit 14 may be configured to recognize the center of the AGV characteristic unit 22 based on the direction marker 23. That is, for example, the arithmetic processing unit 14 may be configured to recognize the tip end and the rear end of the arrow that is the direction marker 23, and acquire the center of the AGV characteristic unit 22 by calculation (that is, estimation).

FIG. 12 is a plan view showing the first bogie 2c. FIG. 13 is a plan view showing the second bogie 2d. Similar to the AGV 1, the bogie characteristic unit 25 (a type of the first characteristic unit according to the disclosure) for indicating a position or a direction of each of the bogies 2c and 2d is attached to each of the bogies 2c and 2d. The bogie characteristic unit 25 according to the present embodiment is separately attached to positions in front of and in the rear of a region where the cargo B is loaded on the loading platform 18, that is, positions not covered by the cargo B when the cargo B is loaded. In the present embodiment, a triangular front marker 26 is displayed on a front side of the loading platform 18, and a circular rear marker 27 is displayed on a rear side of the loading platform 18. The bogie characteristic unit 25 includes a combination of the markers 26 and 27, that is, the front marker 26 and the rear marker 27. Similar to the case of the AGV 1, the arithmetic processing unit 14 of the information processing device 4 can know the movements of the bogies 2c and 2d by recognizing the bogie characteristic unit 25 of each of the bogies 2a and 2b from the image data imaged by the camera 3. In this case, the information processing device 4 can know a direction of the bogie 2 by recognizing the front marker 26 and the rear marker 27 different from each other in shapes or arrangement patterns. In addition, the information processing device 4 estimates a center position of the bogie 2 based on a position of the front marker 26 and a position of the rear marker 27.

Furthermore, in the present embodiment, the information processing device 4 is configured to be able to identify each bogie 2 by changing the number of the rear marker 27 for each bogie 2. That is, as shown in FIG. 12, one rear marker 27 is attached to the first bogie 2c while two rear markers 27 arranged side by side in a left and right direction are attached to the second bogie 2d. Accordingly, the information processing device 4 can identify each bogie 2 by recognizing the different rear markers 27. In brief, the information processing device 4 can identify each bogie 2 by attaching different shapes, numbers, arrangement patterns, and the like of the bogie characteristic unit 25 to the bogie 2. When the loading platform 18 of the bogie 2 has a configuration in which the loading platform 18 is a box type that accommodates the cargo therein and the cargo is covered up by the upper surface of the loading platform 18 as viewed from above (that is, from the camera 3 side), the bogie characteristic unit 25 including a combination of a direction marker and a center marker can also be attached to the upper surface of the loading platform 18 in a similar manner as the AGV characteristic unit 22.

The camera 3 includes a lens, a CCD, a wireless communication unit, and the like (not shown), and outputs image data obtained by imaging the AGV 1 and the bogie 2 that travel on the travel course to the wireless communication unit 16 of the information processing device 4 via the wireless communication device 5. As shown in FIG. 10, the cameras 3 are separately provided at a position corresponding to a region where the AGV 1 and the bogie 2 travel along a virtual curve of the travel route R to change a travel route of the AGV 1 and the bogie 2 in the travel course of the AGV 1, and a position corresponding to a via-point V (corresponds to a third region according to the disclosure) where the AGV 1 is temporarily stopped and the cargo is loaded onto or unloaded from the bogie 2. Positions of the cameras 3 on the map data or heights of the cameras 3 with respect to the travel route R, that is, three-dimensional coordinates of the cameras 3, are pre-fixed and then calibration is completed. The cameras 3 are adjusted so as to be able to recognize the AGV characteristic unit 22 of the AGV 1 and the bogie characteristic unit 25 of the bogie 2 from the images obtained by imaging the AGV 1 and the bogie 2 on the travel course by an image processing performed by the information processing device 4.

The information processing device 4 according to the present embodiment includes the arithmetic processing unit 14, the storage unit 15, and the wireless communication unit 16. The storage unit 15 includes a hard disk drive or the like. The storage unit 15 stores the map data, route data, image data imaged by the cameras 3, and the like in addition to various application programs including an operation system and an image processing application. The arithmetic processing unit 14 includes a CPU, a ROM, a RAM, and the like (not shown), and performs various types of processings such as an image processing in accordance with the operation system stored in the storage unit 15. The arithmetic processing unit 14 functions as a movement acquisition unit according to the disclosure, and acquires the movement of the AGV 1, that is, a position (in other words, coordinates on the map data) and a direction on the travel course, by recognizing the AGV characteristic unit 22 from the image data imaged by the camera 3. More specifically, the arithmetic processing unit 14 recognizes the AGV characteristic unit 22 by comparing the image data with a pre-prepared reference image (referred to as a template as appropriate) of the AGV characteristic unit 22, that is, by template matching. Then, the arithmetic processing unit 14 acquires a direction of the AGV 1 by recognizing a direction of the arrow that is the direction marker 23. The arithmetic processing unit 14 acquires coordinates of the AGV 1 on the map data by recognizing the circle that is the center marker 24 of the AGV characteristic unit 22. Similarly, the arithmetic processing unit 14 recognizes the bogie characteristic unit 25 from image data by template matching with a pre-prepared reference image of the bogie characteristic unit 25, acquires a travel direction of the bogie 2 by recognizing a positional relationship between the front marker 26 and the rear marker 27, and acquires coordinates of the center of the bogie 2 on the map data by calculation. The arithmetic processing unit 14 identifies each bogie 2 by recognizing the number of the rear markers 27 of each bogie 2. Therefore, the arithmetic processing unit 14 can know the number or the like of the bogie 2 coupled to and pulled by the AGV 1.

FIG. 14 is a flowchart showing a flow of a traveling control (that is, a traveling control method) of the AGV 1 performed by the information processing device 4. When an operation instruction is transmitted from the information processing device 4 to the AGV 1, as shown in FIG. 10, the AGV 1 travels while pulling the bogie 2 in accordance with the operation instruction so as to trace the travel route R set in the travel course based on the map data and the route data. When the AGV 1 and the bogie 2 approach the second region where the AGV 1 and the bogie 2 travel along the virtual curve of the travel route R, or the third region corresponding to the via-point V where the AGV 1 is temporarily stopped, the AGV 1 and the bogies 2c and 2d are imaged by the cameras 3. Then, the information processing device 4 acquires image data including the AGV 1 and the bogies 2c and 2d imaged by the cameras 3 (step S11). Subsequently, the arithmetic processing unit 14 of the information processing device 4 performs template matching described above for the acquired image data (step S12). Next, as a result of the template matching, it is determined whether the AGV characteristic unit 22 and the bogie characteristic unit 25 can be detected from the image data (step S13). When it is determined that the characteristic units 22 and 25 are not detected (No), the traveling control returns to step S11, and image data is acquired from the cameras 3 again to perform template matching.

When it is determined the characteristic units 22 and 25 are detected in step S13 (Yes), states of the AGV 1 and the bogies 2c and 2d are acquired based on the detected characteristic units 22 and 25 (step S14). That is, the arithmetic processing unit 14 functions as a movement acquisition unit, to acquire the movement of the AGV 1 based on the AGV characteristic unit 22, that is, a direction (in other words, a travel direction at the time of traveling) and a position within the travel course, and to acquire directions and positions of the bogies 2c and 2d based on the bogie characteristic unit 25 in a similar manner. In this manner, the movements of the AGV 1 and the bogie 2 can be more accurately acquired by recognizing the characteristic units 22 and 25 included in the images imaged by the cameras 3. Since the movements of the AGV 1 and the bogie 2 when the AGV 1 and the bogie 2 actually travel on the travel course can be acquired, the traveling of the AGV 1 and the bogie 2 can be more accurately controlled. Subsequently, the arithmetic processing unit 14 converts the acquired positions of the AGV 1 and the bogies 2c and 2d into three-dimensional coordinates (step S15). That is, the positions of the AGV 1 and the bogies 2c and 2d are converted, based on a relationship between pixel coordinates of positions (centers) of the AGV 1 and the bogies 2c and 2d on the image data and three-dimensional coordinates on the map data obtained by imaging the AGV 1 and the bogies 2c and 2d by the cameras 3, into three-dimensional coordinates while adding a height (Z) with respect to the travel route R to coordinates (X, Y) on the map data. The height is not essential and a configuration in which the positions are converted into two-dimensional coordinates (X, Y) may be adopted.

Next, the arithmetic processing unit 14 stores (or updates) the three-dimensional coordinates obtained by conversion as comparison route data used for comparison with pre-stored route data (step S16). Then, it is determined whether the creation of the comparison route data from the entry of the AGV 1 and the bogies 2c and 2d into an imaging range of the camera 3 to the passing of the AGV 1 and the bogies 2c and 2d through the imaging range is completed (step S17). When it is determined that the creation is not completed (No), the traveling control returns to step S11 to perform subsequent processings. The comparison route data including a three-dimensional coordinate group is updated by sequentially acquiring three-dimensional coordinates from the image data. When it is determined that the creation of the comparison route data from the entry of the AGV 1 and the bogies 2c and 2d into the region to the passing of the AGV 1 and the bogies 2c and 2d through the region is completed in step S17 (Yes), the arithmetic processing unit 14 compares the comparison route data with the pre-stored route data, and in accordance with a comparison result, gives feedback to the AGV 1 about the traveling control of the AGV 1 (step S18). More specifically, the arithmetic processing unit 14 functions as a traveling state determination unit according to the disclosure, to determine traveling states of the AGV 1 and the bogies 2c and 2d based on the travel direction and the position of the AGV 1 and the travel direction and the position of the bogies 2c and 2d.

FIGS. 15 and 16 are diagrams showing a traveling state determination of the AGV 1 and the bogies 2c and 2d. FIG. 17 is a diagram showing setting of a travel region 30 for determining the traveling state. Regarding the traveling state determination of the AGV 1 and the bogies 2c and 2d, the arithmetic processing unit 14 determines whether the AGV 1 and the bogies 2c and 2d travel inside the travel region 30 having a predetermined width with reference to the travel route R (in other words, a set route). In the present embodiment, as shown in FIG. 17, virtual boundary lines Bd1 and Bd2 are separately set along the travel route R at positions sandwiching both sides of the travel route R and are separated from the travel region R at a predetermined interval (that is, a threshold), and a space between the virtual boundary lines Bd1 and Bd2 is set as the travel region 30. Modifications:

FIGS. 18 and 19 are diagrams showing setting of the travel region 30 for determining a traveling state according to a modification. The setting of the travel region 30 is not limited to the setting in the example shown in FIG. 17. For example, as in an example shown in FIG. 18, an operator can, by using an input unit such as a mouse in an image processing application, set the virtual boundary lines Bd1 and Bd2 to any lines on an image imaged by the camera 3. In the example shown in FIG. 18, passages P for a person to pass through are provided on outer sides sandwiching roadside strips Rs of the travel course of the AGV 1 and the bogies 2c and 2d, and the virtual boundary lines Bd1 and Bd2 are set between the roadside strips Rs and the travel route R so that the AGV 1 and the bogies 2c and 2d do not protrude to the passages P. As shown in FIG. 19, routes Rp on which the AGV 1 and the bogie 2 actually travel in the past are stored as past route data, the virtual boundary lines Bd1 and Bd2 are set, based on the past route data, slightly outside the routes Rp on which the AGV 1 and the bogie 2 frequently travel, and thus a range including the routes Rp can be set as the travel region 30.

As shown in FIG. 15, when both the AGV 1 and the bogies 2c and 2d are located within the travel region 30, the arithmetic processing unit 14 determines a normal traveling state in which both the AGV 1 and the bogies 2c and 2d travel normally along the scheduled travel route R. In the case of the normal traveling state, feedback about the traveling control of the AGV 1 is not given. On the other hand, as shown in FIG. 16, when at least one of the AGV 1 and the bogies 2c and 2d is located outside the travel region 30, the arithmetic processing unit 14 determines an abnormal traveling state in which one of the AGV 1 and the bogies 2c and 2d deviates from the travel route R. In this manner, whether the bogie 2 travels normally along the travel route R can be determined by determining whether at least the bogie 2 is located inside the travel region 30.

As in the example shown in FIG. 16, in the second region where the AGV 1 and the bogies 2c and 2d travel along the virtual curve, when any one of the AGV 1 and the bogies 2c and 2d protrude outside the virtual boundary line Bd2 located outside the virtual curve, the arithmetic processing unit 14 gives feedback to the AGV 1 about a travel speed reducing instruction. In contrast, when any one of the AGV 1 and the bogies 2c and 2d protrude outside the virtual boundary line Bd1 located inside the virtual curve, the arithmetic processing unit 14 gives feedback to the AGV 1 about a travel speed increasing instruction. Then, the control unit 9 of the AGV 1 controls the drive units 8 in accordance with the feedback from the arithmetic processing unit 14 of the information processing device 4 to perform speed adjustment (that is, reducing the travel speed or increasing the travel speed). Accordingly, the traveling is controlled (that is, the traveling state is corrected) so that both the AGV 1 and the bogies 2c and 2d are located within the travel region 30. In this manner, in the traveling control system and the control method for the AGV 1 according to the disclosure, unstable traveling when the AGV 1 travels while pulling the bogies 2c and 2d loading the cargo is prevented. That is, regardless of the number of the bogie 2 pulled by the AGV 1 and the amount and the weight of the cargo loaded on the bogie 2, the wobbling during the traveling of the AGV 1 and the bogie 2 can be prevented and the AGV 1 and the bogie 2 can travel along the scheduled travel route R. In particular, the camera 3 is provided in the second region where wobbling is likely to occur during the traveling of the AGV 1 and the bogie 2, the movements of the AGV 1 and the bogie 2 are acquired based on the image imaged by the camera 3, and the traveling of the AGV 1 is controlled based on the movements, so that unstable traveling in the second region is more reliably prevented. Since a total weight of the bogie 2 may be changed by loading the cargo onto or unloading cargo from the bogie 2 at the via-point, wobbling is likely to occur in the traveling of the AGV 1 and the bogie 2 when the traveling is restarted. According to the present embodiment, the camera 3 is also provided in the third region corresponding to the via-point, the movements of the AGV 1 and the bogie 2 are acquired based on the image imaged by the camera 3, and the traveling of the AGV 1 is controlled based on the movements, so that unstable traveling when the traveling of the AGV 1 and the bogie 2 is stopped and then restarted is more reliably prevented.

FIGS. 20 to 22 are diagrams showing feedback of the traveling control of the AGV 1 according to modifications. In an example shown in FIG. 20, a first zone Z1 and a second zone Z2 are each set inside and outside the virtual boundary lines Bd1 and Bd2, and a control is performed corresponding to the zones Z1 and Z2. For example, when at least one of the AGV 1 and the bogies 2c and 2d is located in the first zone Z1, feedback is given to the AGV 1 about a travel speed reducing instruction. When at least one of the AGV 1 and the bogies 2c and 2d is located in the second zone Z2, feedback is given to the AGV 1 about a traveling stopping instruction. In this case, the arithmetic processing unit 14 may perform a processing of notifying that the AGV 1 is stopped abnormally.

In an example shown in FIG. 21, when the AGV 1 and the bogie 2 travel on a route on which the AGV 1 and the bogie 2 may deviate from the travel region 30, based on a relationship between a route of the AGV 1 and the bogie 2 calculated from the comparison route data described above and the virtual boundary lines Bd1 and Bd2, the arithmetic processing unit 14 gives feedback to the AGV 1 about an instruction of changing the travel direction towards an opposite side (in other words, a travel route R side). Accordingly, when the AGV 1 and the bogie 2 approach to a left side with reference to the travel route R, for example, a place indicated by X in FIG. 21, the control unit 9 of the AGV 1 performs a control to reduce rotation of the right drive unit 8 and increase rotation of the left drive unit 8. As a result, the travel direction of the AGV 1 and the bogie 2 is changed to a direction towards the travel route R. In this manner, the AGV 1 and the bogie 2 are controlled to travel within the travel region 30.

In an example shown in FIG. 22, when the AGV 1 or the bogie 2 deviates to outer sides of the travel region 30, deviation information such as a travel speed and a deviation direction of the AGV 1 (that is, the AGV 1 or the bogie 2 deviates from which boundary line of the virtual boundary lines Bd1 and Bd2) at the time of deviation is output to the AGV 1 from the information processing device 4 and the control unit 9 of the AGV 1 performs a predetermined control (for example, a control of stopping the traveling or changing the direction) corresponding to the deviation information.

As in the modifications described above, the AGV 1 and the bogies 2c and 2d are prevented, by giving feedback to the AGV 1 about the traveling control, from traveling and deviating from the travel region 30. Even when the AGV 1 and the bogies 2c and 2d deviate from the travel region 30, the traveling may be stopped or a measure (for example, reloading the cargo loaded on the bogie 2) may be taken by a person such as an operator. The AGV 1 and the bogies 2c and 2d are prevented from coming into contact with an article or a structure provided in the vicinity of the travel course.

FIG. 23 is a diagram showing an example of an image obtained by imaging the bogie 2 from a side.

Although the embodiment described above describes a configuration in which modes are acquired and determined based on an image obtained by imaging the AGV 1 and the bogie 2 from above in a direction orthogonal to a floor surface of the travel course, the disclosure is not limited thereto and may adopt a configuration in which modes are acquired and determined based on an image obtained by imaging the AGV 1 and the bogie 2 from a side in addition to the image obtained by imaging the AGV 1 and the bogie 2 from above. In a modification shown in FIG. 23, shelf boards 29 divide an inner side of the loading platform 18, implemented by combining with a frame member such as a pipe, into a plurality of cargo accommodation units 28, specifically, three cargo accommodation units 28a, 28b, and 28c. The number of the cargo accommodation units 28 is not limited to three. In such a configuration, a position of a center of gravity of the bogie 2 is different depending on a fact that the cargo B is accommodated in which cargo accommodation unit 28. Therefore, based on the image imaged from the side, the arithmetic processing unit 14 acquires, as a mode, that the cargo B is accommodated and loaded in which cargo accommodation unit 28 of the bogie 2. In this case, a shape of a side of the loading platform 18 (for example, a shape indicated by hatching in FIG. 23) is used as a template, and the arithmetic processing unit 14 recognizes and acquires the position of the cargo B based on the template.

In an example shown in FIG. 23, the cargo B is accommodated in the uppermost cargo accommodation unit 28a among the plurality of cargo accommodation units 28, and no cargo B is accommodated in other cargo accommodation units 28b and 28c. Therefore, compared with a state in which no cargo B is accommodated in any of the cargo accommodation units 28 or a state in which the cargo B is accommodated in the cargo accommodation units 28b and 28c, a state in which the position of the center of gravity of the entire bogie 2 in a height direction thereof is high and the balance is lowered is acquired as a mode. In this case, based on the mode, the arithmetic processing unit 14 creates or corrects an operation plan so that the travel speed of the AGV 1, particularly the travel speed when the AGV 1 changes the travel direction at a corner or a curve, is reduced to be lower than a reference value, or a radius of the virtual curve of the travel route R at the corner or the curve is increased. Accordingly, unstable traveling of the AGV 1 and the bogie 2 is prevented even when the of gravity of the entire bogie 2 is high as in the example shown in FIG. 23. When a state in which the center of gravity of the entire bogie 2 is high and the balance is lowered is acquired as one mode, the arithmetic processing unit 14 may notify the operator by displaying the state, for example, on a display device coupled to the information processing device 4. Accordingly, a measure may be taken to change the arrangement position of the cargo B on the loading platform 18. In this case, it is desirable to acquire and determine a mode based on an image obtained by re-imaging the bogie 2 after the measure is taken.

FIG. 24 is a diagram showing the bogie characteristic unit 25 according to a modification. The AGV characteristic unit 22 and the bogie characteristic 25 are not limited to those described in the above embodiment, and may have various forms.

The bogie characteristic unit 25 according to the modification includes a frame-shaped first bogie characteristic unit 25a having a predetermined width along the outer peripheral edge of the plate-like loading platform 18, similar to the bogie characteristic unit 25 according to the first embodiment described above, and a second bogie characteristic unit 25b including a plurality of circular markers that are arranged vertically and horizontally and that are separated at intervals from each other in a region inside the first bogie characteristic unit 25a. Similar to the bogie characteristic unit 25 according to the first embodiment, the first bogie characteristic unit 25a is a characteristic unit used to identify the shape of the bogie 2 and the presence or absence of protrusion of the cargo B from the loading platform 18. On the other hand, the second bogie characteristic unit 25b is a characteristic unit used to identify the arrangement position of the cargo B on the loading platform 18.

In the modification shown in FIG. 24, the arithmetic processing unit 14 recognizes by template matching with the image data, among the plurality of second bogie characteristic units 25b, at which positions the second bogie characteristic units 25b are recognized, that is, at which positions the second bogie characteristic units 25b are covered by the cargo B. Thus, an arrangement of the cargo B on a loading surface of the loading platform 18 can be acquired as one mode. When the cargo B is arranged in a biased position on the loading surface of the loading platform 18, the center of gravity of the bogie 2 changes from a state in which the cargo B is not loaded. Therefore, the arithmetic processing unit 14 reflects this point in the operation plan. For example, when the cargo B on the loading platform 18 is biased to the right with respect to the travel direction, the center of gravity of the bogie 2 is biased to the right. Therefore, the travel speed of the AGV 1 is reduced to be lower than a reference value, or the radius of the virtual curve of the travel route R is increased when the AGV 1 turns to the left. Accordingly, unstable traveling of the AGV 1 and the bogie 2 is prevented even when the center of gravity of the bogie 2 is biased. On the other hand, an operation plan may be created or corrected so that the travel speed of the AGV 1 or the radius of the virtual curve of the travel route R may be set to the reference value when the AGV 1 turns to the right, or the travel speed may be increased to be faster than the reference value and the radius of the virtual curve of the travel route R may be reduced. Accordingly, since the AGV 1 and the bogie 2 can travel faster on the travel route R, the operation time can be shortened. The number, shape, and arrangement layout of the second bogie characteristic units 25b are not limited to those shown in FIG. 24. When the number of the second bogie characteristic units 25b is large and the second bogie characteristic units 25b are densely arranged, the arrangement position of the cargo B can be more accurately identified.

FIG. 25 is a diagram showing the AGV characteristic unit 22 according to a modification. Although only the AGV 1 is shown in FIG. 25 as a representative, configurations in the following description can be applied to the bogie 2 in a similar manner. In this modification, an LED marker 32 formed of a light emitting diode is used as the AGV characteristic unit 22. For example, a first LED marker 32a is provided at a front side of the AGV 1, and a second LED marker 32b is provided at a position corresponding to the center of the AGV 1. The LED markers 32a and 32b are different from each other in light emission modes, that is, for example, a light emission color, a light on/off manner, a magnitude of a light source, and the like. The different light emission modes may be one that can be recognized in an image processing performed by the arithmetic processing unit 14 based on the image imaged by the camera 3. The LED marker 32 is not limited to a light emitting device, and may be, for example, a reflection plate that reflects light.

The number and arrangement layout of the LED marker 32 are not limited to those described above, and the LED marker 32 may be provided at positions in front of or in the rear of a region where the cargo is loaded on the AGV 1 and the bogie 2 in a similar manner as the front marker 26 and the rear marker 27 described above. In an example shown in FIG. 26, the AGV 1 is coupled to the bogie 2 in a state in which the AGV 1 is under the bogie 2, and the AGV 1 travels in this state. Even in such a case, since the LED markers 32a and 32b that are characteristic units are not covered by the bogie 2, a problem that the AGV characteristic unit 22 and the bogie characteristic unit 25 cannot be detected from the image imaged by the camera 3 can be prevented. For example, center positions of the AGV 1 and the bogie 2 may be estimated by attaching markers only to positions in front of a region where the cargo or the like is loaded on the AGV 1 and the bogie 2 and detecting characteristic amounts such as edge shapes of the AGV 1 and the bogie 2 by template matching or the like in the rear of the region.

FIG. 27 is a diagram showing the AGV characteristic unit 22 according to another modification. The AGV characteristic unit 22 according to this modification includes a frame-shaped first AGV characteristic unit 22a having a predetermined width along an outer peripheral edge of the AGV 1, similar to the bogie characteristic unit 25 according to the first embodiment described above, and a second AGV characteristic unit 22b including circular markers. Similar to the bogie characteristic unit 25 according to the first embodiment, the first AGV characteristic unit 22a is used to identify a coupling state of the AGV 1 to the bogie 2 in addition to recognition of the shape or the center position of the AGV 1. The second AGV characteristic unit 22b is formed of a marker provided in front of the AGV 1, and is a characteristic unit used to identify a direction and a posture of the AGV 1. The marker as the second AGV characteristic unit 22b may have various shapes, and may be the LED marker described above, a reflection plate reflecting light, or the like.

In the modification shown in FIG. 27, the arithmetic processing unit 14 can acquire, as a coupling mode, a coupling state of the AGV 1 to the bogie 2 by recognizing, by template matching with image data, the entire first AGV characteristic unit 22a or the first AGV characteristic unit 22a with a part thereof missing. In the example shown in FIG. 27, the AGV 1 is coupled to the bogie 2 in a state of being under the bogie 2, and the AGV 1 travels in this state. In this case, a part of the first AGV characteristic unit 22a is recognized as missing. Accordingly, the arithmetic processing unit 14 can acquire a coupling mode in which the AGV 1 is coupled to the bogie 2 in a state of being under the bogie 2, and reflect the coupling mode in the traveling control of the AGV 1. For example, since traveling stability is improved in this coupling mode as compared with a coupling mode in which the bogie 2 is coupled to the coupling unit 12 of the AGV 1, the arithmetic processing unit 14 creates or corrects an operation plan so that the travel speed of the AGV 1 is faster than a travel speed in a case of a reference mode (that is, a coupling mode in which the bogie 2 is coupled to the coupling unit 12 of the AGV 1), or the radius of the virtual curve of the travel route R is reduced. Accordingly, since the AGV 1 and the bogie 2 can travel faster on the travel route R, the operation time can be shortened.

FIGS. 28 to 31 are diagrams showing identification of the AGV 1 and the bogie 2. Although only the AGV 1 is shown in FIGS. 28 to 30, configurations in the following description can be applied to the bogie 2 in a similar manner. The AGV characteristic unit 22 is omitted in the figures.

Regarding the identification of the AGV 1 or the bogie 2, for example, the AGV 1 or the bogie 2 can be identified by changing shapes, numbers, arrangement patterns, and the like of the AGV characteristic unit 22 and the bogie characteristic unit 25 for the AGV 1 and the bogie 2. In addition, as shown in FIG. 28, a different character string, symbol, or the like may be attached to the AGV 1 or the bogie 2, and the AGV 1 or the bogie 2 may be individually identified based on the character string or the like. For example, as shown in FIG. 29, an identification code 33 for identifying the AGV 1 or the bogie 2 may be attached to the AGV 1 or the bogie 2, and the AGV 1 or the bogie 2 may be individually identified by reading the identification code 33 by the arithmetic processing unit 14 from an image including the identification code 33. The identification code 33 shown in FIG. 29 is formed of a two-dimensional code (for example, a so-called QR code (registered trademark)). In addition, the identification code 33 may be a bar code or a unique identification code.

As shown in FIGS. 30 and 31, a wireless marker 34 (for example, a radio frequency identification (RFID) tag and a beacon) for storing identification information of the AGV 1 or the bogie 2 is attached to the AGV 1 or the bogie 2. The wireless marker 34 may have a configuration in which identification information of the AGV 1 or the bogie 2 is acquired by performing wireless communication using an electromagnetic induction method, a radio wave method, or the like between the wireless marker 34 and a reader 35 (in other words, a detector and receiver). In this case, as shown in FIG. 31, the reader 35 is separately provided at installation positions of the cameras 3, and identification information read by the readers 35 is transmitted to the information processing device 4, so that the AGV 1 or the bogie 2 can be individually identified by the information processing device 4.

Third Embodiment

FIG. 32 is a configuration diagram showing a traveling control system according to the third embodiment. FIG. 33 shows an example of an image imaged by a plurality of cameras 3 shown in FIG. 32.

The above-described first embodiment describes a configuration in which one camera 3 is provided in each of the region corresponding to the start point of the travel route R on the travel course of the AGV 1 and the region corresponding to the via-point V where the AGV 1 is temporarily stopped and the cargo is loaded onto or unloaded from the bogie 2. The above-described second embodiment describes a configuration in which one camera 3 is provided in each of the region where the AGV 1 changes the travel direction along the virtual curve of the travel route Ron the travel course of the AGV 1 and the region corresponding to the via-point V where the AGV 1 is temporarily stopped and the cargo is loaded onto or unloaded from the bogie 2. However, the disclosure is not limited thereto.

In the present embodiment, a plurality of cameras 3, specifically, two cameras of a first camera 3a and a second camera 3b are provided in each region as shown in FIG. 32. The number of cameras 3 is not limited to two, and a configuration in which three or more cameras 3 are provided may be adopted. As shown in FIG. 33, modes of the AGV 1 and the bogie 2 can be more accurately acquired, by combining images imaged by the plurality of cameras 3, in a wider region based on images imaged in a wider field of view (that is, angle of view). In addition, since the traveling control of the AGV 1 can be performed in a wider region, unstable traveling of the AGV 1 and the bogie 2 is more reliably prevented.

When the plurality of cameras 3 are used, three-dimensional positions, including a height with respect to the travel route R, of the AGV characteristic unit 22 and the bogie characteristic unit 25 can be separately detected according to a triangulation principle. Therefore, even when the height of the AGV 1 and the height of the bogie 2 are extremely different as shown in FIG. 32, the positions of both the AGV 1 and the bogie 2 can be acquired more accurately. Other configurations are the same as those in the embodiments described above.

Modification:

A configuration in which modes or movements of the AGV 1 and the bogie 2 are acquired based on the image imaged by the camera 3, the traveling state is determined based on the modes or movements, and the traveling of the AGV 1 is controlled is described. The disclosure is not limited thereto, and may adopt a configuration in which it is not always necessary to acquire the mode of the AGV 1, the mode of at least the bogie 2 (for example, modes of a plurality of bogies 2 when a plurality of bogies 2 are pulled) is acquired and determined to create or correct an operation plan, and the traveling of the AGV 1 is controlled.

The disclosure is not limited to the configuration in which movements of the AGV 1 and the bogie 2 are acquired based on the image imaged by the camera 3, and may, for example, adopt a configuration in which the bogie 2 is provided with an acceleration sensor or the like for detecting an acceleration in directions of a horizontal direction (in other words, an X axis), a front-rear direction (in other words, a Y axis) and a height direction (in other words, a Z axis), and the movement of the bogie 2 is acquired based on a detection result of the acceleration sensor.

The disclosure can be similarly applied to a configuration in which an induction marker (for example, magnetic tape) is attached to a floor surface along the travel route R, and the AGV 1 and the bogie 2 travel along the marker.

The disclosure can also be applied to a configuration in which the bogie 2 is provided with a robot arm. In this case, the center of gravity of the entire bogie 2 is different between a state in which the robot arm holds the cargo, components, and the like and a state in which the robot arm holds no cargo, component, and the like. Alternatively, the center of gravity of the entire bogie 2 is different depending on a direction of the robot arm (that is, a position of a portion holding the cargo, the component, and the like). Even in such a configuration, a state such as a direction of the robot arm is acquired and determined as a mode of the bogie 2 based on an image including the bogie 2, and the mode is reflected in the control of the AGV 1, so that unstable traveling of the AGV 1 and the bogie 2 is prevented.

REFERENCE SIGN LIST 1 transport vehicle (AGV)
2 bogie
3 camera
4 information processing device
5 wireless communication device
6 main body frame
7 drive wheel
8 drive unit
9 control unit
10 caster
11 laser sensor
12 coupling unit
14 arithmetic processing unit
15 storage unit
16 wireless communication unit
18 loading platform
19 caster
20 coupling unit
22 AGV characteristic unit
23 direction marker
24 center marker
25 bogie characteristic unit
28 cargo accommodation unit
29 shelf board
32 LED marker
33 identification code
34 wireless marker
35 reader

The invention claimed is:

1. A traveling control system for a transport vehicle that autonomously travels together with a bogie,
traveling of the transport vehicle being controlled according to a mode of the bogie that travels in an operation region, wherein
the operation region has a first region, a second region, and a third region, and
the third region is a region where the bogie is stopped, and
the traveling control system for a transport vehicle comprising:
an imaging unit provided corresponding to the third region of the operation region of the transport vehicle; and
circuitry is configured to acquire a mode of the bogie based on an image including the bogie imaged by the imaging unit.

2. The traveling control system for a transport vehicle according to claim 1, wherein
a first characteristic unit is attached to the bogie, and
the circuitry is further configured to acquire the mode of the bogie based on an image including the first characteristic unit imaged by the imaging unit.

3. The traveling control system for a transport vehicle according to claim 2, wherein the circuitry is further configured to:
　determine a mode of the bogie based on the acquired mode of the bogie, wherein
　the traveling of the transport vehicle is controlled based on a determination of the circuitry.

4. The traveling control system for a transport vehicle according to claim 2, wherein
　a second characteristic unit is attached to the transport vehicle,
　the circuitry is further configured to acquire a coupling mode of the transport vehicle to the bogie based on an image including the second characteristic unit imaged by the imaging unit, and
　the traveling of the transport vehicle is controlled based on the coupling mode acquired by the circuitry.

5. The traveling control system for a transport vehicle according claim 2, wherein
　the operation region has a via-point through which the bogie passes, and
　the imaging unit is provided corresponding to the via-point.

6. A traveling control system for a transport vehicle that autonomously travels together with a bogie, wherein
　traveling of the transport vehicle is controlled according to a movement of the bogie that travels in an operation region, wherein
　　the operation region has a first region, a second region, and a third region, and
　　the third region is a region where the bogie is stopped.

7. The traveling control system for a transport vehicle according to claim 6, comprising:
　an imaging unit provided corresponding to an operation region of the bogie; and
　a circuitry is further configured to acquire a movement of the bogie based on an image including the bogie imaged by the imaging unit.

8. The traveling control system for a transport vehicle according to claim 7, wherein
　a first characteristic unit is attached to the bogie, and
　the circuitry is further configured to acquire the movement of the bogie based on an image including the first characteristic unit imaged by the imaging unit.

9. The traveling control system for a transport vehicle according to claim 7, wherein the circuitry is further configured to:
　determine a traveling state of the bogie based on the acquired movement of the bogie, wherein
　the traveling of the transport vehicle is controlled based on a determination of the circuitry.

10. The traveling control system for a transport vehicle according to claim 9, wherein
　the circuitry is further configured to determine whether the bogie is located inside a travel region having a predetermined width with reference to a travel route of the bogie that is preset in the operation region.

11. The traveling control system for a transport vehicle according to claim 7, wherein
　a second characteristic unit is attached to the transport vehicle,
　the circuitry is further configured to acquire the movement of the transport vehicle based on an image including the second characteristic unit imaged by the imaging unit, and
　the traveling of the transport vehicle is controlled based on the acquired movement of the transport vehicle.

12. The traveling control system for a transport vehicle according to claim 7, wherein
　the bogie travels along a virtual straight line in the first region and the bogie travels along a virtual curve in the second region, and
　the imaging unit is further provided corresponding to the second region.

13. A traveling control method for a transport vehicle that autonomously travels together with a bogie, the method comprising:
　controlling traveling of the transport vehicle according to a mode of the bogie that travels in an operation region, wherein
　　the operation region has a first region, a second region, and a third region, and
　　the third region is a region where the bogie is stopped; and
　acquiring a mode of the bogie based on an image including the bogie imaged by an imaging unit, wherein the imaging unit is provided corresponding to the third region of the operation region.

* * * * *